United States Patent
Wu et al.

(10) Patent No.: US 11,064,498 B2
(45) Date of Patent: Jul. 13, 2021

(54) RESOURCE ALLOCATION METHOD AND DEVICE IN COMMUNICATIONS SYSTEM

(71) Applicant: Huawei Technologies Co., Ltd., Shenzhen (CN)

(72) Inventors: Ming Wu, Shenzhen (CN); Chi Zhang, Shanghai (CN); Yueying Zhao, Shanghai (CN); Yuanjie Li, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 23 days.

(21) Appl. No.: 16/521,811

(22) Filed: Jul. 25, 2019

(65) Prior Publication Data

US 2019/0349943 A1     Nov. 14, 2019

Related U.S. Application Data

(63) Continuation of application No. PCT/CN2018/074204, filed on Jan. 25, 2018.

(30) Foreign Application Priority Data

Jan. 25, 2017 (CN) .......................... 201710061297.6

(51) Int. Cl.
    *H04W 72/04*      (2009.01)
    *H04W 76/27*      (2018.01)
    *H04L 5/00*      (2006.01)

(52) U.S. Cl.
    CPC ....... *H04W 72/0493* (2013.01); *H04L 5/0051* (2013.01); *H04W 72/042* (2013.01); *H04W 72/0453* (2013.01); *H04W 76/27* (2018.02)

(58) Field of Classification Search
None
See application file for complete search history.

(56) References Cited

U.S. PATENT DOCUMENTS 5,473,556 A * 12/1995 Aguilar ................. G06F 7/768
                                                          708/404
9,204,435 B2    12/2015    Lee et al.
(Continued)

FOREIGN PATENT DOCUMENTS

| CN | 101374018 A | 2/2009 |
|---|---|---|
| CN | 105636211 A | 6/2016 |
| CN | 105979597 A | 9/2016 |

OTHER PUBLICATIONS

Samsung, "Preceding granularity of NR DMRS", 3GPP TSG RAN WG1 Ad-hoc Meeting, R1-1700930, Spokane, USA, Jan. 16-20, 2017, 6 pages.

(Continued)

*Primary Examiner* — Alex Skripnikov
(74) *Attorney, Agent, or Firm* — Slater Matsil, LLP

(57) ABSTRACT

A resource allocation method and an apparatus in a communications system are provided. A terminal receives resource allocation indication information, where the resource allocation indication information is used to determine a subband corresponding to an allocated resource. The terminal receives second configuration information, where the second configuration information indicates one of a plurality of configurations of the first frequency domain resource unit size corresponding to the subband. And the terminal determines a size of a first frequency domain resource unit corresponding to the subband based on first configuration information and the second configuration information, where the first configuration information includes a correspondence between the subband and a plurality of configurations of the first frequency domain resource unit size.

15 Claims, 6 Drawing Sheets

201

A terminal determines a size of a first frequency domain resource unit based on configuration information

202

The terminal determines a resource-allocation-related parameter based on the size of the first frequency domain resource unit

(56) References Cited

U.S. PATENT DOCUMENTS

| | | | |
|---|---|---|---|
| 2012/0188950 A1* | 7/2012 | Luo | H04L 5/0035 |
| | | | 370/329 |
| 2013/0121278 A1 | 5/2013 | Noh et al. | |
| 2016/0227520 A1 | 8/2016 | Davydov et al. | |
| 2019/0281489 A1* | 9/2019 | Hong | H04L 5/0064 |
| 2019/0320450 A1 | 10/2019 | Li et al. | |

OTHER PUBLICATIONS

NEC, "Numerology indication for a mixed numerology carrier", 3GPP TSG RAN WG1 Meeting NR Adhoc, R1-1700860, Spokane, USA, Jan. 16-20, 2017, 5 pages.

Huawei, et al., "PRB bundling size for DL data precoding", 3GPP TSG RAN WG1 NR Ad Hoc Meeting, R1-1700413, Huawei, et al., Spokane, USA, Jan. 16-20, 2017, 6 pages.

* cited by examiner

RESOURCE ALLOCATION METHOD AND DEVICE IN COMMUNICATIONS SYSTEM

CROSS-REFERENCE TO RELATED APPLICATIONS

This application is a continuation of International Application No. PCT/CN2018/074204, filed on Jan. 25, 2018, which claims priority to Chinese Patent Application No. 201710061297.6, filed on Jan. 25, 2017. The disclosures of the aforementioned applications are hereby incorporated by reference in their entireties.

TECHNICAL FIELD

This application relates to the field of mobile communications technologies, and in particular, to a resource allocation method and a device in a communications system.

BACKGROUND

In an LTE-A system, a frequency domain resource granularity is a resource block (RB). To avoid excessively high downlink control information (DCI) overheads caused by a large quantity of RBs in the system in a relatively large bandwidth, a resource block group (RBG) is defined in a standard, and one RBG includes one or more consecutive virtual resource blocks (VRB). In the LTE-A system, in some transmission modes, resource allocation is related to an RBG size. The RBG size may be usually considered as a basic granularity for resource scheduling. A maximum system bandwidth supported by the LTE-A system is 20 MHz. In a fixed system bandwidth, the RBG size is fixed, and the RBG size refers to a quantity of VRBs included in the RBG. The RBG size can be determined provided that a system bandwidth size is determined.

In comparison with the LTE-A system, a bandwidth supported by a new radio (NR) system is greatly increased, even up to 1 GHz. When a resource allocation method in LTE-A is applied to a large bandwidth, the RBG size is excessively small, resulting in excessively high resource scheduling overheads. This is not desired. However, if the RBG size is increased based on only a system bandwidth, for example, the RBG size is proportionally increased to 40 RBs at 800 MHz, a scheduling granularity is limited, and flexible scheduling cannot be performed. Different users require different scheduling granularities for different services. A large-packet user has a service requirement of low overheads, a low delay, and a large bandwidth, and is more suitable to use a relatively large scheduling granularity while a small-packet user has a service requirement of low overheads and a small bandwidth, and needs to use a relatively small scheduling granularity.

In conclusion, different services require different resource scheduling granularities. In the NR system, different resource scheduling granularities are more expected to be configured for different services. Apparently, in the prior art, there is a technical problem that a fixed resource scheduling granularity cannot meet a requirement of different resource scheduling granularities for different services.

SUMMARY

This application provides a resource allocation method and a device in a communications system, to implement a configurable resource allocation granularity.

According to a first aspect, an embodiment of this application provides a resource allocation method in a communications system, including: determining, by a terminal, a size of a first frequency domain resource unit based on configuration information, where the configuration information includes predefined first configuration information, or the configuration information includes second configuration information sent by a base station to the terminal, or the configuration information includes the first configuration information and the second configuration information; and determining, by the terminal, a resource-allocation-related parameter based on the size of the first frequency domain resource unit.

In comparison with the prior art, the terminal may determine the size of the first frequency domain resource unit based on only the configuration information, and for different configuration information for the size of the first frequency domain resource unit, may use different sizes of the first frequency domain resource unit, to implement a configurable size of the first frequency domain resource unit, so that a resource allocation granularity can be flexibly configured in a scenario of a large bandwidth or a new application requirement, to meet different service requirements. The size of the first frequency domain resource unit is determined based on the predefined first configuration information, avoiding overheads caused when the base station indicates the size of the first frequency domain resource unit to the terminal.

In a possible design, the first frequency domain resource unit is a set of one or more consecutive virtual resource blocks.

For example, the first frequency domain resource unit is the foregoing RBG, the RBG is one VRB, or the RBG is a set including n consecutive VRBs. A plurality of configuration values for an RBG size are implemented by configuring different values of n.

In a possible design, the first configuration information includes a correspondence between the size of the first frequency domain resource unit and at least one of a subband identifier and a frequency band identifier.

For example, the first configuration information includes a correspondence between the subband identifier and the size of the first frequency domain resource unit, and the correspondence may be a one-to-one correspondence or may be a one-to-many correspondence. When the subband identifier is in a one-to-one correspondence with the size of the first frequency domain resource unit, the terminal may directly determine, based on the first configuration information, the size that is of the first frequency domain resource unit and that corresponds to the subband identifier. In this way, when a service has a corresponding RBG size requirement, a resource that needs to be used by the service may be allocated to a corresponding subband. Therefore, different service requirements are met.

For another example, when the subband identifier is in a one-to-many correspondence with the size of the first frequency domain resource unit, to select one size of the first frequency domain resource unit from a plurality of sizes of the first frequency domain resource unit that correspond to the subband identifier, the terminal may further obtain the second configuration information. The second configuration information is indication information sent by the base station to the terminal, and the indication information can indicate a value for one size of the first frequency domain resource unit in the plurality of sizes of the first frequency domain resource unit that correspond to the subband identifier. In this scenario, the second configuration information only needs to occupy a relatively small quantity of bits to indicate the size of the first frequency domain resource unit, so that in a large bandwidth scenario, a resource allocation granularity can be flexibly configured by using relatively low overheads, to meet different service requirements.

In a possible design, the determining, by the terminal, a resource-allocation-related parameter based on the size of the first frequency domain resource unit includes: determining, by the terminal based on the size of the first frequency domain resource unit, a quantity of bits required for resource allocation. Because the size of the first frequency domain resource unit is configurable, the quantity of bits required for resource allocation is also adjustable. Therefore, in the large bandwidth scenario or the new application requirement scenario, a resource allocation overhead problem is considered in setting the size of the first frequency domain resource unit.

In a possible design, the method further includes that a resource allocation parameter of the terminal is related to a size of a second frequency domain resource unit.

For example, an existing resource allocation type 2 may be further improved based on a relationship between the size of the second frequency domain resource unit and consecutive physical resource blocks, so that a resource indication value for resource allocation is related to the size and a quantity of second frequency domain resource units. Alternatively, a resource mapping manner is improved, so that in a distributed resource mapping process, a resource interleaving manner is related to the size of the second frequency domain resource unit.

In a possible design, the method further includes: determining, by the terminal, the resource-allocation-related parameter based on the size of the first frequency domain resource unit and the size of the second frequency domain resource unit.

The resource-allocation-related parameter includes at least one of a quantity of bits required for resource allocation, a resource indication value for resource allocation, and a resource mapping manner for resource allocation.

For example, an existing resource allocation type 1 and a resource mapping manner for the resource allocation type 1 may be further improved by configuring a relationship between the size of the first frequency domain resource unit and the size of the second frequency domain resource unit, so that a quantity of bits of a first domain and a quantity of bits of a third domain in DCI of a resource allocation indication are still related to the size of the first frequency domain resource unit. However, the size of the first frequency domain resource unit in this case is an integer multiple of the size of the second frequency domain resource unit. In an LTE-A system, an $N_{RB}^{DL}$ parameter in the DCI indicates a total quantity of downlink RBs in the system. In this design, the parameter becomes a total quantity of second frequency domain resource units in the system.

In a possible design, the second frequency domain resource unit is a set of one or more consecutive physical resource blocks.

The second frequency domain resource unit may be a block, and one block includes one PRB, or one block is a set including n consecutive physical resource blocks (PRB) or RBs. A plurality of configuration values for a block size can be implemented by configuring different values of n, where n is a positive integer greater than 1. For example, every two physical resource blocks in a system bandwidth are classified into one second frequency domain resource unit, and the size of the second frequency domain resource unit is 2.

In a possible design, the method further includes: receiving, by the terminal, a first reference signal sent by the base station, where the first reference signal is carried in at least one second frequency domain resource unit.

In a possible design, the method further includes: sending, by the terminal, a second reference signal to the base station, where the second reference signal is carried in at least one second frequency domain resource unit.

In a possible design, the size of the first frequency domain resource unit is N times the size of the second frequency domain resource unit, where N is an integer greater than or equal to 1. The size of the first frequency domain resource unit is determined as a positive integer multiple of the size of the second frequency domain resource unit. When there are a plurality of configuration values for the size of the second frequency domain resource unit, the size of the first frequency domain resource unit may be determined based on the size of the second frequency domain resource unit, to implement a configurable size of the first frequency domain resource unit. Alternatively, when there are a plurality of configuration values for the size of the first frequency domain resource unit, the size of the second frequency domain resource unit is determined based on the size of the first frequency domain resource unit, to implement a configurable size of the second frequency domain resource unit.

For another example, the resource mapping manner supported by the existing resource allocation type 1 is improved by using an N-times relationship between the size of the first frequency domain resource unit and the size of the second frequency domain resource unit, so that allocated consecutive VRBs can be mapped to consecutive physical resource blocks.

According to a second aspect, this application provides a resource allocation method in a communications system, including: sending, by a base station, second configuration information to a terminal, where the second configuration information is used to indicate a size of a first frequency domain resource unit to the terminal, and the size of the first frequency domain resource unit is used to determine a resource-allocation-related parameter.

The base station directly indicates the second configuration information to the terminal, so that the terminal may determine the size of the first frequency domain resource unit based on the second configuration information, to implement a configurable size of the first frequency domain resource unit, or the terminal may determine the size of the first frequency domain resource unit based on the second configuration information indicated by the base station and predefined first configuration information in the terminal, to implement a configurable size of the first frequency domain resource unit. Therefore, in a scenario of a large bandwidth or a new application requirement, a resource allocation granularity can be flexibly configured, to meet different service requirements.

In a possible design, the first frequency domain resource unit is a set of one or more consecutive virtual resource blocks. For example, the first frequency domain resource unit is the foregoing RBG, and the RBG is one VRB, or the RBG is a set including m consecutive VRBs, where m is a positive integer greater than 1. A plurality of configuration values for an RBG size are implemented by configuring different values of m.

In a possible design, the method further includes: sending, by the base station, a first reference signal to the terminal, where the first reference signal is carried in at least one second frequency domain resource unit; and/or receiving, by the base station, a second reference signal sent by the terminal, where the second reference signal is carried in at least one second frequency domain resource unit.

In a possible design, the size of the first frequency domain resource unit is N times the size of the second frequency domain resource unit, where N is an integer greater than or equal to 1. The size of the first frequency domain resource unit is determined as a positive integer multiple of the size of the second frequency domain resource unit. When there are a plurality of configuration values for the size of the second frequency domain resource unit, the size of the first frequency domain resource unit may be determined based on the size of the second frequency domain resource unit, to implement a configurable size of the first frequency domain resource unit. Alternatively, when there are a plurality of configuration values for the size of the first frequency domain resource unit, the size of the second frequency domain resource unit is determined based on the size of the first frequency domain resource unit, to implement a configurable size of the second frequency domain resource unit.

For another example, a resource mapping manner supported by an existing resource allocation type 1 is improved by using an N-times relationship between the size of the first frequency domain resource unit and the size of the second frequency domain resource unit, so that allocated consecutive VRBs can be mapped to consecutive physical resource blocks.

In a possible design, the second frequency domain resource unit is a set of one or more consecutive physical resource blocks. For example, the second frequency domain resource unit is a block, and one block includes one PRB, or one block is a set including m consecutive PRBs. A plurality of configuration values for a block size can be implemented by configuring different values of m, where m is a positive integer greater than 1.

According to a third aspect, this application provides a terminal that may perform the terminal-related method steps in various embodiments of this application, so that in a scenario of a large bandwidth or a new application requirement, excessively high indication overheads of resource allocation are avoided, and in addition, a resource allocation granularity can also be flexibly configured, to meet different service requirements.

In a possible design, the terminal includes a plurality of function modules, configured to perform the terminal-related method steps in various embodiments of this application, so that in a large bandwidth scenario, a resource allocation granularity can be flexibly configured, to meet different service requirements.

In a possible design, a structure of the terminal includes a processor and a transceiver. The processor is configured to support the terminal in performing corresponding functions in the foregoing resource allocation method in the communications system. The transceiver is configured to: support communication between the terminal and a base station, and send information or an instruction used in the foregoing resource allocation method in the communications system to the base station. The terminal may further include a memory. The memory is coupled to the processor and configured to store a program instruction and data that are necessary for the terminal.

According to a fourth aspect, this application provides a base station that may perform the base-station-related method steps in various embodiments of this application, so that in a large bandwidth scenario, excessively high indication overheads of resource allocation are avoided, and a resource allocation granularity can also be flexibly configured, to meet different service requirements.

In a possible design, the base station includes a plurality of function modules, configured to perform the base-station-related method steps in various embodiments of this application, so that in a large bandwidth scenario, a resource allocation granularity can be flexibly configured, to meet different service requirements.

In a possible design, a structure of the base station includes a processor and a transceiver. The processor is configured to support the base station in performing corresponding functions of the base station in the foregoing resource allocation method in the communications system. The transceiver is configured to: support communication between the base station and a terminal, and send information or an instruction used in the foregoing resource allocation method in the communications system to the terminal. The base station may further include a memory. The memory is coupled to the processor and configured to store a program instruction and data that are necessary for the base station.

According to a fifth aspect, this application provides a computer-readable storage medium. The computer-readable storage medium stores an instruction. When the instruction runs on a computer, the computer is enabled to perform the method according to the first aspect or any possible implementation of the first aspect.

According to a sixth aspect, this application provides a computer-readable storage medium. The computer-readable storage medium stores an instruction. When the instruction runs on a computer, the computer is enabled to perform the method according to the second aspect or any possible implementation of the second aspect.

According to a seventh aspect, this application provides a computer program product including an instruction. When the instruction runs on a computer, the computer is enabled to perform the method according to the first aspect or any possible implementation of the first aspect.

According to an eighth aspect, this application provides a computer program product including an instruction. When the instruction runs on a computer, the computer is enabled to perform the method according to the second aspect or any possible implementation of the second aspect.

and

Figure 9:
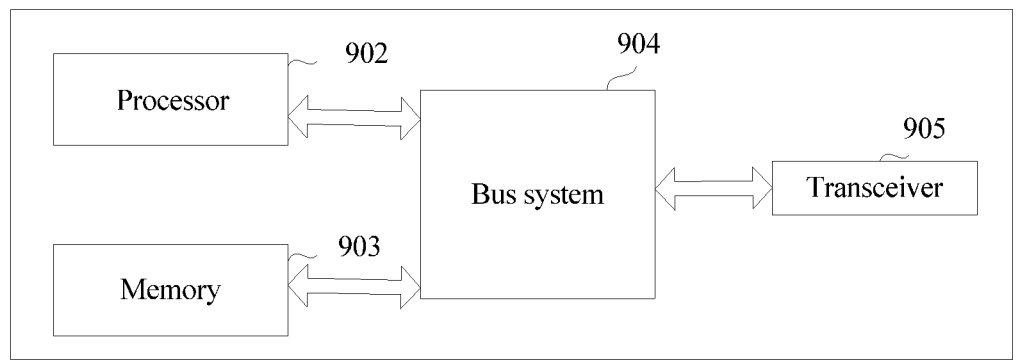

FIG. 9 is a schematic structural diagram of a terminal or a base station according to this application.

DESCRIPTION OF EMBODIMENTS

To make the objectives, technical solutions, and advantages of this application clearer, the following further describes this application in detail with reference to the accompanying drawings.

The following describes a system operating environment of this application. A technology described in this application is applicable to an LTE system, such as an LTE/LTE-A/eLTE system, or another wireless communications system that uses various radio access technologies, such as a system that uses the following access technologies: code division multiple access (CDMA), frequency division multiple access (FDMA), time division multiple access (TDMA), orthogonal frequency division multiple access (OFDMA), single carrier frequency division multiple access (SC-FDMA), and the like. The technology is further applicable to a subsequent evolved system, such as a fifth generation 5G (which may also be referred to as new radio (NR)) system, and is also applicable to a similar wireless communications system, such as cellular systems related to Wi-Fi, WiMAX, and 3GPP.

Figure 1:
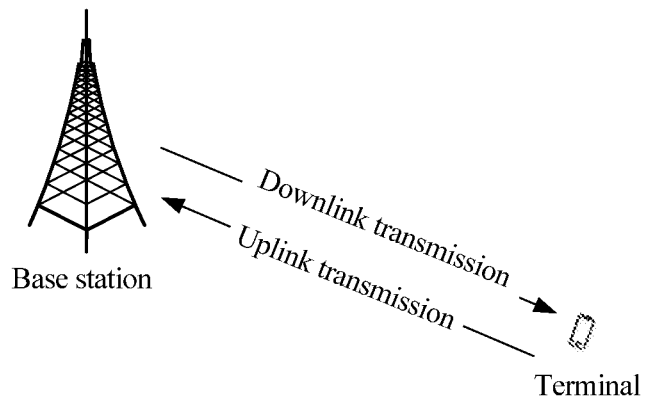
FIG. 1 is a schematic architectural diagram of an LTE system and a new generation wireless communications system according to this application.

FIG. 1 shows a basic architecture of a communications system according to this application. A base station and a terminal may transmit data or signaling through a wireless interface, and the transmission includes uplink transmission and downlink transmission. The terminal mentioned in this application may be a device that provides voice and/or data connectivity for a user, and includes a wired terminal and a wireless terminal. The wireless terminal may be a handheld device with a wireless connection function, another processing device connected to a wireless modem, or a mobile terminal that communicates with one or more core networks over a radio access network. For example, the wireless terminal may be a mobile phone, a computer, a tablet computer, a personal digital assistant (PDA), a mobile Internet device (MID), a wearable device, and an e-book reader. For another example, the wireless terminal may also be a portable, pocket-sized, handheld, computer built-in, or in-vehicle mobile device. For another example, the wireless terminal may be a mobile station and an access point. UE is one of terminals, and is a name in an LTE system. For ease of description, in subsequently description of this application, the devices mentioned above are collectively referred to as terminals. The base station mentioned in this application is an apparatus that is deployed in a radio access network (RAN) and configured to provide a wireless communication function for the terminal. The base station may include a macro base station, a micro base station, a relay site, an access point, a base station controller, a transmission reception point (TRP), and the like in various forms. The base station may have different names in systems that use different radio access technologies. For example, in an LTE network, the base station is referred to as an evolved NodeB (eNB), and in a subsequent evolved system, the base station may also be referred to as a new radio nodeB (gNB).

The following describes terms mentioned in this application.

A relationship between a user and a terminal (or UE) in this application may be as follows: The user accesses a network by using the terminal (or the UE), to implement communication with a base station.

A physical resource block (PRB) in this application is a unit of a time-frequency resource, occupies one subframe or one slot in time domain, and occupies M consecutive subcarriers in frequency domain, where M is a natural number greater than 0. In LTE, the physical resource block occupies 14 consecutive OFDM symbols in one subframe in time domain, and occupies 12 consecutive subcarriers in frequency domain.

A first frequency domain resource unit in this application may be an RBG, and one RBG may be a set of one or more consecutive virtual resource blocks, or may include one or more second frequency domain resource units. A second frequency domain resource unit is a block, and one block includes one physical resource block or one block is a set of m consecutive physical resource blocks.

The second frequency domain resource unit in this application may be understood as a block (or a resource unit), and is obtained by dividing a section of bandwidth based on a frequency domain dimension. In this way, an RS of the UE in a particular bandwidth is an RS in one second frequency domain resource unit, or is formed by connecting and combining reference signals (RS) of a plurality of second frequency domain resource units. In addition, the second frequency domain resource unit may be further considered as a set of one or more consecutive physical resource blocks (PRB). In some application scenarios, it needs to ensure that at least N consecutive virtual resource blocks (VRB) are mapped to N consecutive PRBs, and a length of the second frequency domain resource unit is N.

A precoding resource block group (precoding resource block group, PRG) in this application is a parameter that represents a precoding granularity, and is used to indicate a quantity of RBs that may use same precoding. Similar to the RBG, a PRG size is also a parameter related to a system bandwidth, and the PRG size is related to an RBG size to some extent.

A block reference signal in this application is a block RS or a resource unit specific reference signal (RS), and is a new reference signal design. A main design idea of the block RS (or the resource unit specific RS) is to divide a section of bandwidth into a plurality of blocks (or resource units), and design an RS for each block (or resource unit). An RS of the UE in a particular bandwidth is formed by connecting and combining one or more block RSs.

A subframe in this application may be understood as follows: One subframe occupies a time-frequency resource in an entire system bandwidth in frequency domain and occupies a fixed time length in time domain, for example, one millisecond (ms). In addition, one subframe may also occupy K consecutive symbols, where K is a natural number greater than 0. A value of K may be determined based on an actual situation, and this is not limited herein. For example, in LTE, one subframe occupies 14 consecutive OFDM symbols in time domain.

A slot in this application may be understood as follows: A slot refers to a basic time-frequency resource unit, and occupies L consecutive OFDM symbols in time domain, where L is a natural number greater than 0. A value of L may be determined based on an actual situation, for example, may be seven OFDM symbols.

A symbol in this application includes but is not limited to an orthogonal frequency division multiplexing (OFDM) symbol, a sparse code multiple access (SCMA) symbol, a filtered orthogonal frequency division multiplexing (F-OFDM) symbol, or a non-orthogonal multiple access (NOMA) symbol. The symbol may be determined based on an actual situation. Details are not described herein.

The slot in this application may be a slot, a mini-slot, and another time resource unit.

A subcarrier width in this application may be understood as a smallest granularity in frequency domain. For example, in LTE, a subcarrier width of one subcarrier is 15 kHz.

A maximum system bandwidth supported by an LTE-A system is 20 MHz. After a system bandwidth is determined in LTE, a resource allocation granularity RBG size may be determined. In a fixed system bandwidth, there is only one RBG size. However, in an NR system, a higher bandwidth is supported. Especially in a high frequency band (for example, a frequency band higher than 6 GHz), spectrum space is very large. Therefore, a supported bandwidth is greatly increased, even up to a system bandwidth of 800 MHz or 1 GHz. In a same system bandwidth, a quantity of RBs is magnificently greater than that in LTE. For example, in an 800 MHz system bandwidth and a 60 KHz subcarrier spacing, the quantity of RBs in the system may exceed 1100 RBs. Because a plurality of types of services are required, different resource allocation granularities may be required, and there may be a plurality of configurable RBG sizes in one system bandwidth. Use of a specific RBG size may be indicated by the base station. In this embodiment, in a large bandwidth scenario, the resource allocation granularity, namely, the RBG size, is flexibly configured, to meet different service requirements.

Based on the foregoing content, this application provides a resource allocation method, mainly used to determine a size of a first frequency domain resource unit. The method includes: determining, by a terminal, the size of the first frequency domain resource unit based on configuration information.

The first frequency domain resource unit is a set of one or more consecutive virtual resource blocks. The first frequency domain resource unit is the foregoing RBG, and the RBG is a VRB, or a set of n consecutive VRBs. A plurality of configuration values for an RBG size are implemented by configuring different values of n.

There are a plurality of implementations for the determining, by a terminal, the size of the first frequency domain resource unit based on configuration information.

In a first possible design, the configuration information includes first configuration information predefined between the terminal and a base station. The first configuration information includes a correspondence between the size of the first frequency domain resource unit and at least one piece of resource location information, and the resource location information may include related configuration information of at least one of a subband, a frequency band, numerology, and a subcarrier to which an allocated resource belongs. For example, the first configuration information includes a correspondence between the size of the first frequency domain resource unit and at least one of a subband identifier, a frequency band identifier, numerology, and a subcarrier. The numerology refers to a set of various possible parameters or configuration parameters, such as a bandwidth and a cyclic prefix.

The predefined first configuration information may be a correspondence between a subband identifier and the size of the first frequency domain resource unit, a correspondence between a frequency band identifier and the size of the first frequency domain resource unit, a correspondence between a numerology identifier and the size of the first frequency domain resource unit, or a correspondence between a subcarrier identifier and the size of the first frequency domain resource unit. The predefined first configuration information is predefined related configuration information of the size of the first frequency domain resource unit, and may be specified in a protocol or a standard. A base station side and a terminal side may be considered to have known the predefined configuration information, so that the base station does not need to use indication information to indicate the size of the first frequency domain resource unit to the terminal, and overheads caused by the base station by using the indication information to indicate the size of the first frequency domain resource unit to the terminal are avoided. Certainly, it is not excluded that the predefined first configuration information is indicated by the base station to the terminal by using system information, high layer signaling or initial access information.

Specifically, the terminal may determine the size of the first frequency domain resource unit based on the predefined first configuration information, provided that the terminal knows the location information of the allocated resource, such as at least one of a subband identifier, a frequency band identifier, a numerology identifier, and a subcarrier identifier. Alternatively, the terminal may determine, based on resource-allocation-related information or other information, at least one of a subband, a frequency band, numerology, or a subcarrier to which the allocated resource belongs, and may determine the size of the first frequency domain resource unit based on the predefined first configuration information.

The terminal learns of, by using resource allocation indication information indicated by the base station, the location information of the allocated resource. For example, the base station sends resource allocation indication information to the terminal, and the resource allocation indication information includes the location information of the allocated resource. The terminal receives the resource allocation indication information, and may learn of, according to the resource allocation indication information, a specific subband or a specific frequency band to which the allocated resource belongs, or specific numerology used to obtain the allocated resource, or a specific subcarrier used to obtain the allocated resource.

For example, the predefined configuration information may be the correspondence between the subband identifier and the size of the first frequency domain resource unit. The subband is divided by the base station, k (k≥1) consecutive PRBs may be set as one subband, and the base station may divide the subband based on different services, different numerology, subcarriers, or others. In a fixed system bandwidth, there are a plurality of available values for the size of the first frequency domain resource unit, and a value for the size of the first frequency domain resource unit is in a one-to-one correspondence with a subband. The terminal may determine, based on a specific subband to which the allocated resource belongs, a size of the currently selected first frequency domain resource unit. In conclusion, a value for the size of the first frequency domain resource unit always corresponds to the subband identifier provided that the subband identifier is determined.

For example, in a particular system bandwidth, there are N (N>1) subbands: a subband #1, a subband #2, . . . , a subband #i, . . . , and a subband #N. For the size of the first frequency domain resource unit in the system bandwidth, there are M (M>1) available configuration values: $V_1$, $V_2$, . . . , $V_i$, . . . , and $V_M$, where N≥M. Then, for a correspondence between a subband and a configuration value for the size of the first frequency domain resource unit, refer to Table 1, where 1≤i≤N and 1≤$a_i$≤M. When 1≤i≤N, 1≤j≤N, and i≠j, $a_i$ and $a_j$ may be equal or may be unequal.

TABLE 1

| Subband | Size of a first frequency domain resource unit |
|---|---|
| Subband #1 | $V_{a1}$ |
| Subband #2 | $V_{a2}$ |
| ... | ... |
| Subband #i | $V_{ai}$ |
| ... | ... |
| Subband #N | $V_{aN}$ |

For another example, when the system bandwidth is 100 RBs, configuration values for the size of the first frequency domain resource unit are 4, 6, 8, or 10, a configuration value for the size of the first frequency domain resource unit used in a subband 1 is 4, a configuration value for the size of the first frequency domain resource unit used in a subband 2 is 6, a configuration value for the size of the first frequency domain resource unit used in a subband 3 is 8, and a configuration value for the size of the first frequency domain resource unit used in a subband 4 is 10.

In a same system bandwidth, the value that is for the size of the first frequency domain resource unit and that corresponds to the frequency band identifier may also be determined based on a predefined correspondence between the frequency band identifier and the size of the first frequency domain resource unit. For example, when the frequency band is 4 GHz and the frequency band is 30 GHz, the sizes of the first frequency domain resource unit can be configured with different values.

It should be noted that the subband is divided by the base station, and the base station may divide the subband based on the different services, the different numerology, the subcarriers, or the others. In addition, the size of the first frequency domain resource unit may be directly related to the numerology or the subcarrier. A relationship between the numerology or the subcarrier and the size of the first frequency domain resource unit is similar to a relationship between the subband and the size of the first frequency domain resource unit. Replacing the subband identifier in the foregoing table with the numerology identifier or the subcarrier identifier results in a relationship between the size of the first frequency domain resource unit and the numerology identifier or the subcarrier identifier.

It should be noted that the frequency band refers to a carrier frequency to which an operating frequency band of a communications system belongs, for example, 4 GHz and 30 GHz discussed in NR. If the correspondence (as shown in the foregoing table) between the subband and the size of the first frequency domain resource unit varies for different frequency bands, user equipment needs to determine the size of the first frequency domain resource unit in combination with the frequency band identifier, the subband identifier, and the configuration information of the base station.

In a second possible design, the configuration information includes second configuration information sent by the base station to the terminal, the second configuration information is indication information sent by the base station to the terminal, and the indication information can directly indicate the size of the first frequency domain resource unit. This solution is applied to a scenario in which the base station directly indicates the size of the first frequency domain resource unit to the terminal.

Specifically, the base station sends the second configuration information to the terminal, and the second configuration information includes an indication of the size of the first frequency domain resource unit. The terminal receives the second configuration information sent by the base station, and determines the size of the first frequency domain resource unit according to the indication of the size of the first frequency domain resource unit in the second configuration information.

A quantity of bits occupied by the indication of the size of the first frequency domain resource unit is determined based on a quantity of configuration values for the size of the first frequency domain resource unit in the system bandwidth. If there are N (N>1) optional configuration values for the size of the first frequency domain resource unit in a system bandwidth, the quantity of bits occupied by the indication of the size of the first frequency domain resource unit is $\lceil \log_2 N \rceil$.

Example 1: When the system bandwidth is 100 RBs, the size of the first frequency domain resource unit can be configured with 4, 6, 8, or 10. When the system bandwidth is 200 RBs, the size of the first frequency domain resource unit can be configured with 4, 8, 12, or 16, and a quantity of configuration values for the size of the first frequency domain resource unit is 4. In this way, the base station may use 2-bit indication information to indicate a specific value for a size of a currently used first frequency domain resource unit.

Example 2: Based on the example 1, when the system bandwidth is 100 RBs, if the 2-bit indication information is 00, it indicates that a size of a selected first frequency domain resource unit is 4. If the 2-bit indication information is 01, it indicates that a size of a selected first frequency domain resource unit is 6. If the 2-bit indication information is 10, it indicates that a size of a selected first frequency domain resource unit is 8. If the 2-bit indication information is 11, it indicates that a size of a selected first frequency domain resource unit is 10.

Example 3: Based on the example 1, when the system bandwidth is 200 RBs, if the 2-bit indication information is 00, it indicates that a size of a selected first frequency domain resource unit is 4. If the 2-bit indication information is 01, it indicates that a size of a selected first frequency domain resource unit is 8. If the 2-bit indication information is 10, it indicates that a size of a selected first frequency domain resource unit is 12. If the 2-bit indication information is 11, it indicates that a size of a selected first frequency domain resource unit is 16.

RBG-related configuration information may be carried in at least one of the following: broadcast signaling, higher layer signaling (such as radio resource control (radio resource control, RRC) signaling), medium access control control element MAC CE) signaling, L1 control signaling (such as DCI), and the like. For example, the higher layer signaling includes a master information block (MIB), a system information block (SIB), radio resource control (RRC) signaling, or other higher layer signaling that has a similar characteristic. For example, the DCI may be used as an indication in each slot (such as a subframe, a slot, or a mini-slot). In this way, overheads for the indication are relatively high. The higher layer signaling or the broadcast signaling may be alternatively used as an indication, and the RBG size is a particular value within a period of time, for example, similar to broadcast signaling carried on a PCFICH in LTE. Alternatively, a time-frequency resource occupied by physical layer broadcast control signaling includes at least one of start OFDM symbols of the slot or the subframe, and the physical layer broadcast control signaling may be detected and received by a group of or all terminals in a cell. The higher layer signaling or the broadcast signaling in combination with the DCI may be alternatively used as an indication. Within a particular period of time, the higher layer signaling or the broadcast signaling is used to indicate that the RBG size may be some values of all configurable values, and then the DCI is used to indicate a specific value for the RBG size. Certainly, another indication method may also be used. This configuration method is also applicable to a configuration process in the following embodiment.

In a third possible design, the configuration information includes the first configuration information and the second configuration information.

The first configuration information includes a correspondence between a plurality of configuration values for the size of the first frequency domain resource unit and at least one of a subband identifier, a frequency band identifier, numerology, or a subcarrier. In this application scenario, there is a correspondence between a subband identifier or a frequency band identifier of predefined RBG size configuration information and a plurality of configuration values for the RBG size. Each subband in a system bandwidth corresponds to one first frequency domain resource unit size set, or each frequency band in a system bandwidth corresponds to one first frequency domain resource unit size set, or each piece of numerology or each subcarrier in a system bandwidth corresponds to one first frequency domain resource unit size set.

The second configuration information is indication information sent by the base station to the terminal. The indication information can indicate one of a plurality of configuration values for the size of the first frequency domain resource unit that correspond to the subband identifier, or the indication information can indicate one of a plurality of configuration values for the size of the first frequency domain resource unit that correspond to the frequency band identifier, or the indication information can indicate one of a plurality of configuration values for the size of the first frequency domain resource unit that correspond to the numerology or the subcarrier.

For example, in this case, the base station may use $\log_2 \mathrm{Max}(n_i)$-bit information ($1 \leq i \leq N$) to indicate a configuration value for the size of the first frequency domain resource unit, where $n_i$ is a total quantity of configuration values in a first frequency domain resource unit size set corresponding to one subband.

For example, there are N (N>1) configuration values for the size of the first frequency domain resource unit for the subband #1, and the base station needs to use $[\log_2 N]$ bits to indicate use of a specific configuration value that is for the size of the first frequency domain resource unit and that corresponds to the subband #1.

For example, in a particular system bandwidth, there are N (N>1) subbands: a subband #1, a subband #2, . . . , a subband #i, . . . , and a subband #N. Each subband corresponds to $n_i$ ($n_i \geq 1$, $1 \leq i \leq N$) values for the size of the first frequency domain resource unit, and all the corresponding values for the size of the first frequency domain resource unit are $V_{11}, V_{12}, \ldots,$ and $V_{1n_1}$; $V_{21}, V_{22}, \ldots,$ and $V_{2n_2}$; . . . ; and $V_{N1}, V_{N2}, \ldots,$ and $V_{Nn_N}$. Then, for a correspondence between the subband and values for the size of the first frequency domain resource unit, refer to Table 2. If $1 \leq i_1, i_2 \leq N$, $1 \leq j_1 \leq n_{i_1}$, and $1 \leq j_2 \leq n_{i_2}$, when $i_1=i_2$ and $j_1=j_2$ do not simultaneously hold, $V_{i_1 j_1}$ and $V_{i_2 j_2}$ may be equal or may be unequal.

TABLE 2

| Subband | First frequency domain resource unit size set |
|---|---|
| Subband #1 | $V_{11}, V_{12}, \ldots, V_{1n1}$ |
| Subband #2 | $V_{21}, V_{22}, \ldots, V_{2n2}$ |
| . . . | . . . |
| Subband #i | $V_{i1}, V_{i2}, \ldots, V_{ini}$ |
| . . . | . . . |
| Subband #N | $V_{N1}, V_{N2}, \ldots, V_{NnN}$ |

In this case, the size of the first frequency domain resource unit may be determined in combination with the subband identifier, the first configuration information, and the information indicated by the base station.

First, the terminal learns of, by using resource allocation indication information indicated by the base station or by using other information, location information of an allocated resource, the resource allocation indication information includes the location information of the allocated resource, and a specific subband or a specific frequency band to which the allocated resource belongs may be determined by using the location information of the resource.

Next, the terminal obtains, based on the predefined first configuration information, a first frequency domain resource unit size set corresponding to an identifier of a subband to which the allocated resource belongs. For example, the subband identifier indicated in the resource allocation indication information is a subband 1, and the terminal obtains a first frequency domain resource unit size set corresponding to the subband 1.

Then, the terminal selects, based on the second configuration information indicated by the base station, one of a plurality of configuration values in the first frequency domain resource unit size set corresponding to the subband 1.

The base station may separately send the resource allocation indication information and the second configuration information, or may send the resource allocation indication information and the second configuration information together.

It is assumed that the predefined first configuration information between the base station and the terminal is as follows: Optional configuration values for the size of the first frequency domain resource unit in the subband 1 are 2 and 3, and optional configuration values for the size of the first frequency domain resource unit in the subband 2 are 4 and 5.

Example 4: Based on the foregoing condition, when the allocated resource is in the subband 1, the base station uses one bit to indicate one configuration value in the first frequency domain resource unit size set corresponding to the subband 1. When an indication value of the one bit is 0, a corresponding size of the first frequency domain resource unit is 2. When an indication value of the one bit is 1, a corresponding size of the first frequency domain resource unit is 3.

Example 5: Based on the foregoing condition, when the allocated resource is in the subband 2, the base station uses one bit to indicate a configuration value for the size of the first frequency domain resource unit in the first frequency domain resource unit size set corresponding to the subband 2. When an indication value of the one bit is 0, a corresponding size of the first frequency domain resource unit is 4. When an indication value of the one bit is 1, a corresponding size of the first frequency domain resource unit is 5.

Likewise, when each frequency band in a system bandwidth corresponds to a first frequency domain resource unit size set, one configuration value in the first frequency domain resource unit size set corresponding to the frequency band may also be determined in a same manner. Details are not described herein again.

It should be noted that the frequency band refers to a carrier frequency to which an operating frequency band of a communications system belongs, for example, 4 GHz and 30 GHz discussed in NR. There may be alternatively the following relationship between the size of the first frequency domain resource unit and the frequency band: In the same system bandwidth, there are a plurality of configuration values for the size of the first frequency domain resource unit in different frequency bands. For example, for a frequency band #1, there are N (N>1) configurable values for the size of the first frequency domain resource unit, and the base station needs to use $\lceil \log_2 N \rceil$ bits to indicate use of a specific size of the first frequency domain resource unit. For a frequency band #2, there are M (M>1) configurable values for the size of the first frequency domain resource unit, and the base station needs to use $\lceil \log_2 M \rceil$ bits to indicate use of a specific size of the first frequency domain resource unit. The user equipment needs to determine the size of the first frequency domain resource unit in combination with the frequency band identifier and the first configuration information of the base station. If the correspondence (as shown in the foregoing table) between the subband and the size of the first frequency domain resource unit varies for different frequency bands, the user equipment needs to determine the size of the first frequency domain resource unit in combination with the frequency band identifier, the subband identifier, and the configuration information of the base station.

A configuration of the size of the first frequency domain resource unit may be further related to numerology, and a configuration method between the numerology and the size of the first frequency domain resource unit is similar to a configuration method between the subband and the size of the first frequency domain resource unit. Replacing the subband described in the foregoing configuration method with the numerology may result in a relationship between the numerology and the size of the first frequency domain resource unit and a corresponding configuration method.

A configuration of the size of the first frequency domain resource unit may be further related to a subcarrier, and a configuration method between the subcarrier and the size of the first frequency domain resource unit is similar to a configuration method between the subband and the size of the first frequency domain resource unit. Replacing the subband described in the foregoing configuration method with the subcarrier may result in a relationship between the subcarrier and the size of the first frequency domain resource unit and a corresponding configuration method.

In a fourth possible design, the size of the first frequency domain resource unit is determined based on a size of a second frequency domain resource unit.

Specifically, the terminal determines the size of the second frequency domain resource unit based on related configuration information.

In a possible design, the second frequency domain resource unit is a set of one or more consecutive physical resource blocks. For example, the second frequency domain resource unit is a block, and the block includes one PRB, or the block is a set including n consecutive PRBs. A plurality of configuration values for a block size may be implemented by configuring different values of n.

For example, the size of the first frequency domain resource unit is N times the size of the second frequency domain resource unit, where N is an integer greater than or equal to 1. The second frequency domain resource unit is a set of one or more consecutive physical resource blocks. The size of the second frequency domain resource unit is predefined between the base station and the terminal. When there are a plurality of configuration values for the size of the second frequency domain resource unit, the size of the first frequency domain resource unit is determined based on the size of the second frequency domain resource unit. A configurable size of the first frequency domain resource unit is also implemented by using a configurable size of the second frequency domain resource unit.

In an LTE system, a PRG is a parameter that represents a precoding granularity, and is used to indicate a quantity of RBs that may use same precoding. Similar to the RBG, a PRG size is also a parameter related to a system bandwidth, and the PRG size is related to an RBG size to some extent. To meet a requirement of a new service scenario, the RBG size is configurable, and the PRG size correspondingly also needs to be configurable.

In the LTE system, in a transmission mode 9, the user equipment sets a precoding granularity to indicate that a plurality of RBs in frequency domain may use the same precoding. The PRG size is a parameter used to indicate the quantity of RBs that may use the same precoding. In the LTE system, a precoding size of a resource block is similar to the size of the first frequency domain resource unit, and a value for the precoding size of the resource block is also related to the system bandwidth. A relationship is shown in Table 3.

TABLE 3

| System bandwidth ($N_{RB}^{DL}$) | PRG size (P') (PRBs) |
| --- | --- |
| ≤10 | 1 |
| 11-26 | 2 |
| 27-63 | 3 |
| 64-110 | 2 |

It can be learned from Table 3 that a value of the PRG size is related to a value of the RBG size to some extent. To meet the requirement of the new application scenario, the RBG size is configurable, and likewise, the PRG size is also configurable.

Therefore, all configuration methods for the RBG size in the foregoing embodiment are also applicable to a configuration for the PRG size. However, magnitude and a quantity of configurable values for the RBG size and magnitude and a quantity of configurable values for the PRG size may be the same or may be different.

Figure 2:
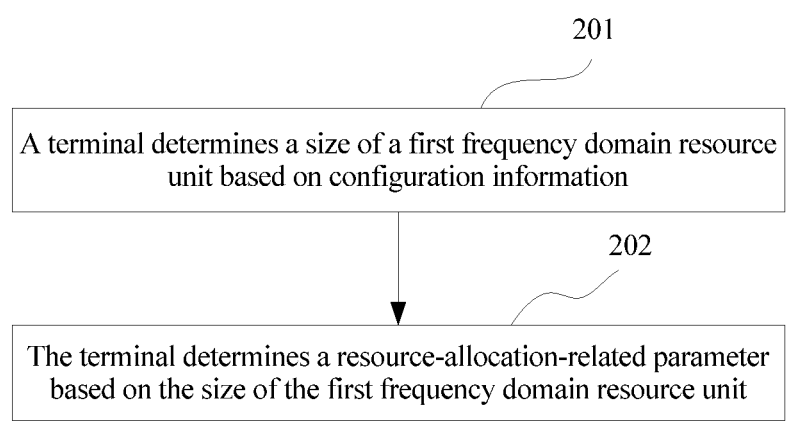
FIG. 2 is a flowchart of a resource allocation method according to this application.

Based on the specific content of the configurable RBG and the configurable PRG in the foregoing embodiment, this application provides a resource allocation method in a communications system. As shown in FIG. 2, the method includes the following steps.

Step 201. A terminal determines a size of a first frequency domain resource unit based on configuration information.

For specific content that a terminal determines a size of a first frequency domain resource unit based on configuration information, refer to the foregoing embodiment. Details are not described herein again.

Step 202. The terminal determines a resource-allocation-related parameter based on the size of the first frequency domain resource unit.

In step 202, the resource-allocation-related parameter includes at least one of a quantity of bits required for resource allocation, a resource indication value for resource allocation, and a resource mapping manner for resource allocation. The quantity of bits required for resource allocation includes a quantity of bits occupied by indication information used to indicate at least one parameter in the resource-allocation-related parameter. For example, the quantity of bits required for resource allocation may be, but not limited to, a quantity of bits occupied by DCI delivered by a base station, or a quantity of bits occupied by at least some domains in the DCI delivered by the base station, or a quantity of bits occupied by a resource indication value (RIV).

For downlink resource allocation, three resource allocation types are defined in an LTE-A system: a resource allocation type 0, a resource allocation type 1, and a resource allocation type 2.

In a first possible design, the quantity of bits required for resource allocation may be determined based on the size of the first frequency domain resource unit.

In the resource allocation type 0, the base station allocates resources in a bitmap manner, each bit corresponds to one RBG, and a value of each bit is used to indicate whether each RBG is to be scheduled. The quantity of bits required for resource allocation is a quantity of bits occupied by a bitmap. The quantity of bits occupied by the bitmap is equal to a quantity of RBGs. The quantity of RBGs is determined based on an RBG size. The RBG size is the size of the first frequency domain resource unit, in other words, a quantity of consecutive VRBs in the RBG. The quantity of RBGs may be represented as $N_{RBG}=\lceil N_{RB}^{DL}/P \rceil$, where p is the RBG size, and $N_{RB}^{DL}$ is a total quantity of RBs.

In the resource allocation type 1, a VRB allocated to the terminal is indicated by using three domains of the DCI, and the VRB allocated to the terminal is in one RBG subset. One RBG subset includes all RBGs, each RBG includes a plurality of consecutive VRBs, and an RBG size is a quantity of consecutive VRBs in the RBG.

A first domain is used to indicate a selected RBG subset, a quantity of bits occupied by the first domain is related to the RBG size, and the quantity of bits occupied by the first domain may be represented as $\lceil \log_2(P) \rceil$, where p is the RBG size.

Because the size of the first frequency domain resource unit is configurable, a quantity of bits required for each of the foregoing two types of resource allocation also changes correspondingly.

In a second possible design, the resource-allocation-related parameter is determined in combination with the size of the first frequency domain resource unit and a size of a second frequency domain resource unit.

For example, the existing resource allocation type 1 may be further improved by configuring a relationship between the size of the first frequency domain resource unit and the size of the second frequency domain resource unit, for example, a quantity of bits of a first domain and a quantity of bits of a third domain in DCI of a resource allocation indication are still related to the size of the first frequency domain resource unit. However, the size of the first frequency domain resource unit in this case is an integer multiple of the size of the second frequency domain resource unit. In LTE-A, an $N_{RB}^{DL}$ parameter in the DCI indicates a total quantity of downlink RBs in the system. In this design, the parameter becomes a total quantity of second frequency domain resource units in the system.

The resource allocation parameter of the terminal is related to the size of the second frequency domain resource unit.

For example, the existing resource allocation type 2 may be further improved based on a relationship between the size of the second frequency domain resource unit and consecutive physical resource blocks, so that the resource indication value for resource allocation is related to a size and a quantity of second frequency domain resource units. Alternatively, the resource mapping manner is improved, so that in a distributed resource mapping process, a resource interleaving manner is related to the size of the second frequency domain resource unit.

In addition to the foregoing examples, the resource indication value for resource allocation may be further determined based on the second frequency domain resource unit. For example, in the resource allocation type 2, a resource allocated to the terminal is indicated by using the RIV, and the resource allocated to the terminal is a segment of consecutive VRBs. Specifically, a start VRB number $RB_{start}$ and a quantity $L_{CRBs}$ of consecutive VRBs starting from the start VRB number that are allocated to the terminal are indicated by using an expression of the RIV.

A resource mapping manner supported by the existing resource allocation type 2 is improved by using an N-times relationship between the size of the first frequency domain resource unit and the size of the second frequency domain resource unit, and a start virtual block number $Block_{start}$, a quantity $L_{CBLs}$ of consecutive virtual blocks, and a total quantity of blocks in a downlink system bandwidth that are allocated to the terminal are indicated by using an expression of the RIV. Therefore, a quantity of bits of the resource indication value is reduced.

Based on the content described in the foregoing embodiments, this application further provides a reference signal sending method, specifically including: receiving, by a terminal, a first reference signal sent by a base station, where the first reference signal is carried in at least one second frequency domain resource unit; or sending, by the terminal, a second reference signal to the base station, where the second reference signal is carried in at least one second frequency domain resource unit.

Based on the foregoing content, the second frequency domain resource unit is a block, the first reference signal and the second reference signal are collectively referred to as block RSs, and a block RS means a reference signal carried in a specific frequency domain resource unit.

Figure 3:
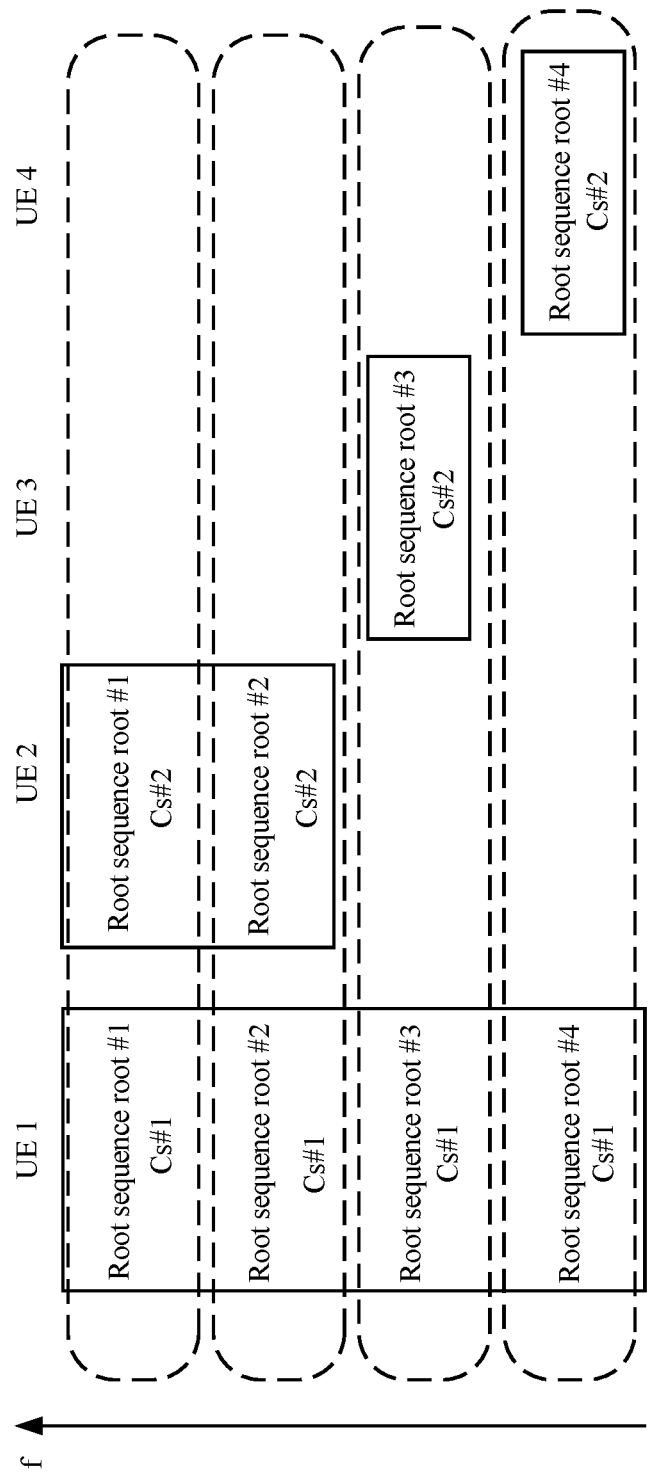
FIG. 3 is a schematic diagram of block RS allocation according to this application.

A main design method of the block RS is to divide a section of large bandwidths into a plurality of blocks or resource units and design an RS for each block. An RS of a user in a particular bandwidth is formed by connecting and combining one or more block RSs, and different blocks use ZC sequences generated by different ZC roots. As shown in FIG. 3, for ease of reading, communication resources used by UE 1, UE 2, UE 3, and UE 4 are expanded and displayed in the figure, and actually, time domain locations of the UE 1, the UE 2, the UE 3, and the UE 4 are the same. It can be learned from FIG. 3 that communication resources used by the UE 2, the UE 3, and the UE 4 separately overlap a communication resource used by the UE 1 in time domain. A section of frequency band is divided into four blocks. For the UE 1, each of the four blocks generates an RS by using ZC sequences generated by a root #1, a root #2, a root #3, and a root #4. For the UE 2, each of the four blocks generates an RS by using ZC sequences generated by the root #1 and the root #2. For the UE 3, each of the four blocks generates an RS by using a ZC sequence generated by the root #3. For the UE 4, each of the four blocks generates an RS by using a ZC sequence generated by the root #4.

When resources partially overlap between a plurality of users of MU-MIMO, a length of a resource overlapping part needs to be an integer multiple of a minimum scheduled resource length. By setting a length of the block RS to the minimum scheduled resource length and particularly designing a block RS sequence, RS orthogonality of a MU-MIMO multi-user overlapping part can be ensured provided that a block part in which multi-user resources overlap is orthogonal. In an NR standard discussion process, some companies consider using the block RS for an uplink, to resolve a problem that resources partially overlap between a plurality of users of uplink MU-MIMO. Considering that the uplink needs to reduce a PAPR, the ZC sequence is usually used during discussion of the block RS. Uplink resource allocation in LTE is consecutive PRBs, and mapping the ZC sequence to the consecutive PRBs can meet performance of a low PAPR. If the ZC sequence is mapped to dispersed PRBs, the PAPR may increase, to be specific, a feature of the low PAPR is no longer met. A symmetric design of uplink and downlink reference signals is also considered in an NR standard discussion. One of symmetric designs is a design method in which a same reference signal is used at a same symbol location in an uplink and a downlink. For example, a block RS design is used in the uplink and downlink. Therefore, the block RS may also be used for a downlink reference signal design. In this embodiment, the first reference signal and the second reference signal are exactly symmetric block RSs.

In existing LTE-A, there are a plurality of resource allocation methods, a resource allocation type 1 and a resource allocation type 2 in a downlink of LTE-A may cause a case in which allocated consecutive virtual resource blocks are mapped to dispersed physical resource blocks. In some new application scenarios, it needs to ensure that some consecutive VRBs are mapped to consecutive PRBs. An existing resource mapping method may not meet this requirement.

For example, when the symmetric first reference signal and second reference signal are transmitted between the base station and the terminal, and the first reference signal and the second reference signal are separately carried in the at least one second frequency domain resource unit, the uplink resource allocation in LTE is to map, to the consecutive PRBs, a resource allocated by using the ZC sequence, and mapping the ZC sequence to the consecutive PRBs can meet performance of a low peak to average power ratio (PAPR). However, based on three downlink resource allocation types and corresponding resource mapping manners defined in an LTE system, the resource allocated by using the ZC sequence may be mapped to dispersed PRBs, and the PAPR increases, to be specific, the feature of the low PAPR is no longer met.

For a resource allocation type 0, the base station allocates resources in a bitmap manner, each bit corresponds to one RBG, and a value of each bit is used to indicate whether each RBG is to be scheduled. A quantity of bits required for resource allocation is a quantity of bits occupied by a bitmap. The quantity of bits occupied by the bitmap is equal to a quantity of RBGs. The quantity of RBGs is determined based on an RBG size. The RBG size is a size of a first frequency domain resource unit, to be specific, a quantity of consecutive VRBs in the RBG. The quantity of RBGs may be represented as $N_{RBG} = \lceil N_{RB}^{DL}/P \rceil$, where p is the RBG size, and $N_{RB}^{DL}$ is a total quantity of RBs.

A mapping manner corresponding to the resource allocation type 0 is centralized mapping. To be specific, VRBs are directly mapped to PRBs one by one, indexes of the VRB and the PRB are the same, and no frequency hopping is performed between slots. Therefore, the resource allocation type 0 can ensure that each RBG is mapped to consecutive PRBs.

For a resource allocation type 1, a VRB allocated to the terminal is indicated by using three domains of DCI. The VRB allocated to the terminal is from one RBG subset. One RBG subset includes all RBGs, each RBG includes a plurality of consecutive VRBs, and an RBG size is a quantity of consecutive VRBs in the RBG. A DCI format includes but is not limited to a format such as a DCI format 1/2/2A/2B/2C.

All RBGs in a system bandwidth are divided into P RBG subsets, where P is a quantity of RBs included in the RBG or a quantity of VRBs included in the RBG. Each RBG subset includes all the RBGs, but sorting is different. An RBG subset p is used as an example, and the RBG subset p includes all RBGs that are separated by P RBGs and that start from an RBG p.

Indication information of the three domains of the DCI is specifically as follows:

A first domain includes $\lceil \log_2(P) \rceil$ bits, used to specify a selected RBG subset, where P is a quantity of RBs included in RBGs in the RBG subset p.

A second domain includes one bit (shift bit), used to specify whether a resource in the subset shifts, 1 indicates a shift, and 0 indicates a non-shift.

A third domain includes a bitmap, each bit of the bitmap corresponds to a VRB in the selected RBG subset, a quantity of bits included in the bitmap is $N_{RB}^{TYPE1} = \lceil N_{RB}^{DL}/P \rceil - \lceil \log_2(P) \rceil - 1$, and the quantity of bits of the bitmap is the same as a quantity of VRBs in the RBG.

After receiving DCI indication information, the terminal first determines the allocated RBG subset according to indication information of the first domain.

Then, the terminal determines, based on information of the second domain, whether the resource in the RBG subset shifts.

Specifically, RBGs in the RBG subset are divided into two groups, the two groups respectively correspond to a resource shift and a resource non-shift, some RBGs between the two groups of RBGs overlap, and a union set of the two groups of RBGs is the RBG subset.

If a value of the second domain is 0, a shift amount $\Delta_{shift}(p)=0$. If a value of the second domain is not 0, $\Delta_{shift}(p) = N_{RB}^{RBG\ subset}(p) = N_{RB}^{TYPE1}$. A minimum VRB number of a selected RBG is a minimum VRB number of the selected RBG subset plus $\Delta_{shift}(p)$, where $N_{RB}^{RBGsubset}(p)$ is a quantity of VRBs included in the RBG subset p, and a calculation formula is as follows:

$$N_{RB}^{RBG\ subset}(p) = \begin{cases} \left\lfloor \frac{N_{RB}^{DL}-1}{P^2} \right\rfloor \cdot P + P, & p < \left\lfloor \frac{N_{RB}^{DL}-1}{P} \right\rfloor \bmod P \\ \left\lfloor \frac{N_{RB}^{DL}-1}{P^2} \right\rfloor \cdot P + (N_{RB}^{DL}-1) \bmod P + 1, & p = \left\lfloor \frac{N_{RB}^{DL}-1}{P} \right\rfloor \bmod P \\ \left\lfloor \frac{N_{RB}^{DL}-1}{P^2} \right\rfloor \cdot P, & p > \left\lfloor \frac{N_{RB}^{DL}-1}{P} \right\rfloor \bmod P \end{cases}$$

Finally, the terminal determines, based on the bitmap of the third domain, whether each VRB in the previously determined RBG is scheduled.

For example, when a value of one bit in the bitmap is 1, a corresponding VRB is configured as "unscheduled," and when a value of one bit in the bitmap is 0, a corresponding VRB is configured as "scheduled."

For the third domain, a VRB corresponding to each bit i may be calculated by using the following formula:

$$n_{VRB}^{RBG\ subset}(p) = \left\lfloor \frac{i + \Delta_{shift}(p)}{P} \right\rfloor P^2 + p \cdot P + (i + \Delta_{shift}(p)) \bmod P$$

A resource mapping manner of the resource allocation type 1 is centralized mapping. To be specific, VRBs are directly mapped to PRBs one by one, indexes of the VRB and the PRB are the same, and no frequency hopping is performed between slots. Because each VRB in the RBG subset in the bitmap corresponds to one bit and the bit is configured as 0 or 1 with a relatively large freedom, not all VRBs allocated to the terminal may be consecutive. Therefore, some of the PRBs to which the VRBs are mapped may be consecutive, and some of the PRBs may be inconsecutive.

To resolve a technical problem that the feature of the low PAPR is not met because VRBs allocated to the terminal are mapped to inconsecutive PRBs in the resource allocation type 1, when a service needs to use the block RS or a segment of consecutive VRBs needs to be mapped to consecutive PRBs, a resource allocation method for the resource allocation type 1 needs to be improved, so that an allocated resource can be mapped to the consecutive PRBs. This application provides an improved resource allocation method for the resource allocation type 1, to meet a requirement of the block RS and another application scenario similar to the requirement of the block RS.

First, for the resource type 1, the following predefined resource configuration is performed between the base station and the terminal.

Each RBG is configured to include a plurality of virtual blocks, each virtual block is mapped to one physical block, and each physical block includes a set of one or more consecutive PRBs. The RBG size is an integer multiple of a block size, and $N_{RB}^{DL}$ is no longer the quantity of downlink RBs, but a quantity of downlink blocks. The RBG herein is the foregoing first frequency domain resource unit, and the RBG size is the size of the first frequency domain resource unit in the foregoing embodiments. The block herein is the second frequency domain resource unit in the foregoing embodiments, and the block size is the size of the second frequency domain resource unit in the foregoing embodiments.

All RBGs in the system bandwidth are divided into P RBG subsets, where P is a quantity of virtual blocks included in the RBG. An RBG subset p includes all RBGs that are separated by P RBGs and that start from an RBG p. Virtual blocks allocated to a particular user need to be from a same RBG subset.

Figure 4:
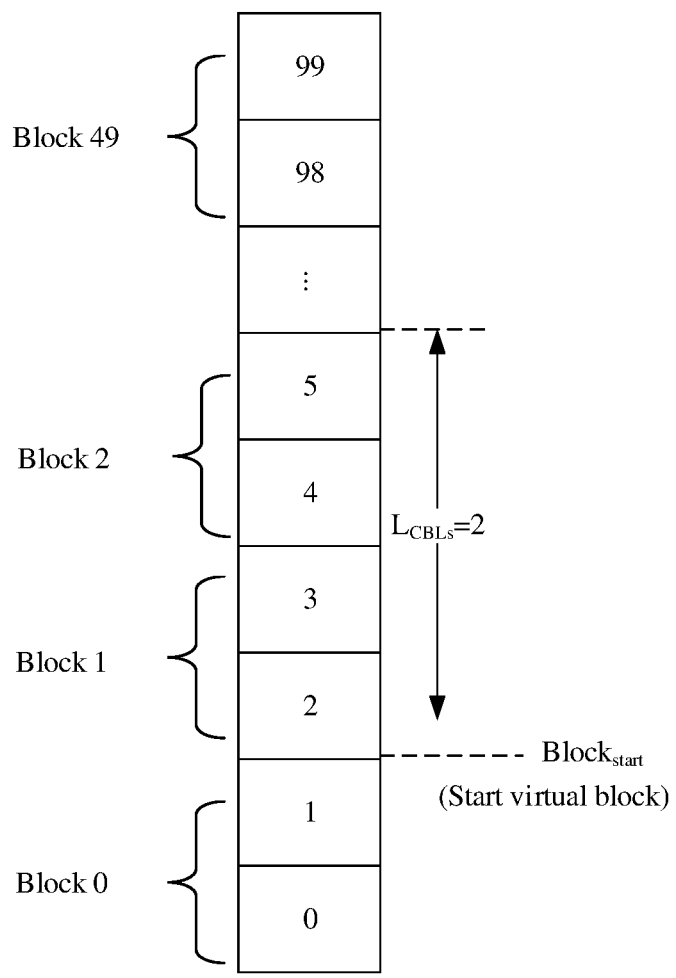
FIG. 4 is a schematic structural diagram of a resource configuration according to this application.

For example, as shown in FIG. 4, there are a total of 100 resource blocks RBs from 0 to 99 in a system bandwidth, and the block size is two RBs. To be specific, every two consecutive RBs are one block in the RBs from 0 to 99, and a total quantity of blocks is 50, namely, $N_{RB}^{DL}$ is 50. The RBG size is an integer multiple of the block size. If the RBG size in this case is two blocks, 50 blocks are divided into 25 RBGs. It is assumed that the 25 RBGs are an $RBG_0$ to an $RBG_{24}$. In this case, the 25 RBGs may form 2 RBG subsets, and each RBG subset includes the 25 RBGs. For example, an $RBG_1$ subset includes all the RBGs that are separated by two RBGs and that start from an $RBG_1$, and the RBGs in the $RBG_1$ subset are $RBG_1$, $RBG_4$, $RBG_7$, $RBG_{10}$, $RBG_{13}$, $RBG_{16}$, $RBG_{19}$, $RBG_{22}$, $RBG_0$, $RBG_3$, $RBG_6$, $RBG_9$, $RBG_{12}$, $RBG_{15}$, $RBG_{18}$, $RBG_{21}$, $RBG_{24}$, $RBG_2$, $RBG_5$, $RBG_8$, $RBG_{11}$, $RBG_{14}$, $RBG_{17}$, $RBG_{20}$, and $RBG_{23}$.

Based on the foregoing predefined configuration, the three domains included in the DCI indicated by the base station to the terminal are changed as follows:

The first domain includes $\lceil \log_2(P) \rceil$ bits, used to specify a selected RBG subset, namely, a value of p, where P is a quantity of virtual blocks included in the RBG, namely, the RBG size. Based on the foregoing example, the value of P is 2, and there is one bit in the first domain. A size of the first domain is related to the RBG size, and the RBG size is related to the block size, or the RBG size is a quantity of blocks included in the RBG.

The second domain includes one bit (shift bit), used to specify whether a resource in the subset shifts, 1 indicates a shift, and 0 indicates a non-shift.

The third domain includes a bitmap, each bit of the bitmap corresponds to a virtual block in a selected RBG subset, a quantity of bits of the bitmap is the same as a quantity of virtual blocks in the RBG, and the quantity of bits included in the bitmap is:

$$N_{RB}^{TYPE1} = \lceil N_{RB}^{DL}/P \rceil - \lceil \log_2(P) \rceil - 1$$

After receiving DCI indication information, the terminal first determines the allocated RBG subset according to indication information of the first domain, and then determines, based on information of the second domain, whether the resource in the RBG subset shifts. Finally, the user equipment determines, based on the bitmap of the third domain, whether each virtual block in the RBG subset indicated by the first domain is scheduled.

Figure 5:
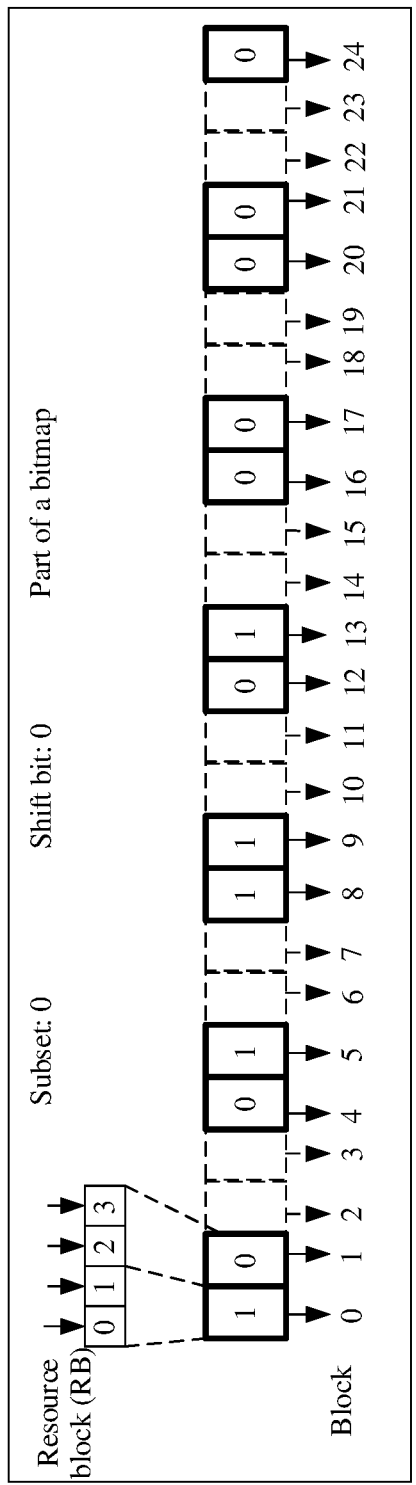
FIG. 5 is a schematic diagram of indication information of a bitmap according to this application.

It is assumed that the selected RBG subset in the first domain includes 25 blocks. For sorting of the 25 blocks in the bitmap of the third domain, refer to FIG. 5. Bit values of virtual blocks including a block 0, a block 5, a block 8, a block 9, and a block 13 in the RBG subset are 1. Virtual blocks allocated to the terminal may be considered as the block 0, the block 5, the block 8, the block 9, and the block 13. A physical block to which each virtual block is mapped includes consecutive PRBs. For example, a physical block to which the block 0 is mapped includes consecutive RB 0 and RB 1.

For the third domain, each bit of the bitmap corresponds to one selected virtual block, to ensure that the physical block to which each virtual block is mapped includes consecutive PRBs. To be specific, based on the bitmap in the third domain, the user equipment determines the scheduled virtual block, or determines a virtual PRB group that includes consecutive PRBs.

If the formula of the resource allocation type 1 is used, a mapping table corresponding to the bitmap and the VRB can still be obtained, but in this case, an identifier (number) of the VRB in the mapping table is replaced with an identifier (number) of the virtual block. In this way, the centralized mapping can ensure that each virtual block is mapped to consecutive PRBs. This is because each bit of the bitmap in the third domain corresponds to the virtual block in the RBG subset instead of the VRB. Therefore, in a centralized mapping manner, it can be ensured that the physical block to which each virtual block is mapped includes consecutive PRBs.

In this improved solution, the base station needs to configure a quantity of RBs in one block, namely, a block size, for the user. For example, the base station performs a configuration by using RRC signaling/broadcast information/a MAC CE or other higher layer signaling or a control channel, and the configuration may be a cell-level configuration or a user-level configuration.

The improved solution is not limited to a downlink, and a same resource allocation method may also be applied to an uplink.

In addition, in the improved solution, based on the foregoing relationship between the size of the first frequency domain resource unit and the size of the second frequency domain resource unit, the quantity of bits of the first domain is related to the size of the first frequency domain resource unit, and a quantity of bits of the third domain is related to the size of the second frequency domain resource unit, so that a quantity of bits required for resource allocation is reduced, in other words, the quantity of bits of the first domain and the quantity of bits of the third domain are reduced, and excessively high overheads of the quantity of bits required for resource allocation are avoided in combination with a configurable solution of at least one of the size of the first frequency domain resource unit and the size of the second frequency domain resource unit in the foregoing content.

In the prior art, the quantity of bits required for resource allocation indicated by the DCI is related to the RBG size or the total quantity $N_{RB}^{DL}$ of RBs. However, the improved solution in this embodiment causes the quantity of bits required for resource allocation to be related to the block size and the total quantity of blocks. For example, when the block size is relatively small, a quantity of bits of resource allocation information in the DCI is relatively large; or when the block size is relatively large, a quantity of bits of resource allocation information in the DCI is relatively small. Therefore, based on the block size, the quantity of bits of resource allocation information in the DCI needs to be determined, or a quantity of bits of the DCI and a resource allocation indication parameter are determined.

The improved resource allocation method for the resource allocation type 1 resolves a problem that the consecutive VRBs allocated to the terminal are mapped to the inconsecutive PRBs in the resource allocation type 1. This solution in combination with a configurable resource allocation granularity may map a resource allocated to the terminal to some consecutive or inconsecutive blocks, and each block resource is consecutive PRBs.

For the resource allocation type 2 in the prior art, a resource allocated to the terminal is indicated by using a resource indication value (RIV), and the resource allocated to the terminal is a segment of consecutive VRBs. Specifically, a start VRB number $RB_{start}$ and a quantity $L_{CRBs}$ of consecutive VRBs starting from the start VRB number that are allocated to the terminal are indicated by using an expression of the RIV.

Specifically, the base station makes an indication by configuring the resource indication value RIV. For example, for a DCI format of a channel such as a physical downlink control channel (PDCCH) or an enhanced physical downlink control channel (EPDCCH), such as a DCI format 1A, a DCI format 1B, and a DCI format 1D, the RIV is defined as follows:

when $(L_{CRBs}-1) \leq \lfloor N_{RB}^{DL}/2 \rfloor$, $RIV=N_{RB}^{DL}(L_{CRBs}-1)+RB_{start}$; and in another case, $RIV=N_{RB}^{DL}(N_{RB}^{DL}-L_{CRBs}+1)+(N_{RB}^{DL}-1-RB_{start})$, where $RB_{start}$ is the start VRB number, $L_{CRBs}$ is the quantity of consecutive VRBs, and $N_{RB}^{DL}$ is the total quantity or RBs in a downlink system bandwidth.

The resource allocation type 2 supports both centralized mapping and distributed mapping.

For example, when the resource mapping from the VRB to the PRB is performed by using the distributed mapping based on the RIV indicated by the base station, there are two steps.

Step 1. Interleaving: Map a consecutive VRB pair to an inconsecutive PRB pair.

Step 2. Frequency hopping of a same VRB number between slots.

For step 1, a quantity of all VRBs that can be used for the distributed mapping in the system bandwidth is calculated according to the following formulas:

$$N_{VRB}^{DL}=N_{VRBgap1}^{DL}=2 \cdot \min(N_{gap}, N_{RB}^{DL}-N_{gap}) \text{ if } N_{gap}=N_{gap,1}, \text{ and}$$

$$N_{VRB}^{DL}=N_{VRBgap2}^{DL}=\lfloor N_{RB}^{DL}/2N_{gap} \rfloor \cdot 2N_{gap} \text{ if } N_{gap}=N_{gap,2}, \text{ where}$$

$N_{gap,1}$ and $N_{gap,2}$ are determined based on the system bandwidth, and a correspondence between $N_{gap,1}$, $N_{gap,2}$, and the system bandwidth is shown in Table 4 below.

TABLE 4

| System bandwidth | Gap ($N_{gap}$) | |
|---|---|---|
| ($N_{RB}^{DL}$) | 1st Gap ($N_{gap,1}$) | 2nd Gap ($N_{gap,2}$) |
| 6-10 | $\lceil N_{RB}^{DL}/2 \rceil$ | N/A |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

In step 1, the base station may indicate $N_{gap}=N_{gap,1}$ or $N_{gap}=N_{gap,2}$ to the terminal by using signaling. When a quantity of VRBs that can be interleaved may be less than the total quantity of VRBs, the VRBs that can be interleaved are interleaved.

After the VRBs that can be interleaved are determined, the VRBs that can be interleaved are divided into one or more interleaving units. Specifically, when $N_{gap}=N_{gap,1}$, $\tilde{N}_{VRB}^{DL}=N_{VRB}^{DL}$, or when $N_{gap}=N_{gap,2}$, $\tilde{N}_{VRB}^{DL}=2N_{gap}$.

VRB numbers in an interleaving unit are written into an interleaving matrix row by row, and the interleaving matrix is of four columns and $N_{row}=\lceil \tilde{N}_{VRB}^{DL}/(4P) \rceil \cdot P$ rows, where P is the RBG size. If the entire matrix cannot be filled, null elements are filled, and the null elements are located in a second column and a fourth column of last $N_{null}/2$ rows. A quantity of elements filled with null is $N_{null}=4N_{row}-\tilde{N}_{VRB}^{DL}$. Then, a VRB number is read in a column-by-column manner, and a null element is ignored, to obtain an interleaved VRB sequence. A sequence number of the interleaved VRB sequence corresponds to a PRB number, to be specific, a PRB corresponding to an interleaved $j^{th}$ VRB (VRB k) is a PRB j.

The frequency hopping between the slots in step 2 means that one VRB is mapped to slots of different PRBs between two slots in LTE, a PRB of an even slot (slot 0) is a PRB obtained in step 1, and a PRB corresponding to an odd slot (slot 1) is a PBR whose number shifts by $\tilde{N}_{VRB}^{DL}/2$ in the interleaving unit of the VRB and that is obtained in step 1.

Although consecutive VRBs are determined in the resource allocation type 2, during the distributed mapping, the consecutive VRBs are mapped to inconsecutive PRBs. Consequently, a PRB resource allocated to the terminal is inconsecutive.

To resolve a technical problem that the feature of the low PAPR is not met because consecutive VRBs allocated to the terminal are mapped to inconsecutive PRBs in the resource allocation type 2, when a service needs to use the block RS, a resource allocation method for the resource allocation type 2 needs to be improved, so that an allocated resource can be mapped to consecutive PRBs. This application provides an improved resource allocation method for the resource allocation type 2, to meet a requirement of the block RS and another application scenario similar to the requirement of the block RS.

In a first possible design, for the resource type 2, the following predefined resource configuration is performed between the base station and the terminal.

A plurality of virtual blocks are configured, each virtual block is mapped to one physical block, and each physical block includes a set of one or more consecutive PRBs. $N_{RB}^{DL}$ is no longer the quantity of downlink RBs, but a quantity of downlink blocks. The block herein is the foregoing second frequency domain resource unit, and the block size is the size of the second frequency domain resource unit. If every two PRBs in all PRB resources correspond to one block, virtual block numbers are 0 to 49 instead of 0 to 99.

In comparison with the foregoing distributed mapping manner of the existing resource allocation type 2, for an element in the interleaving matrix of the distributed mapping from the VRB to the PRB, a VRB number is replaced with a virtual block number, so that each allocated virtual block can be mapped to the consecutive PRBs.

Specifically, the base station makes an indication by configuring a RIV.

The RIV is defined as follows:

when $(L_{CBLs}-1) \le \lfloor N_{RB}^{DL}/2 \rfloor$, $RIV = N_{RB}^{DL}(L_{CBLs}-1) + Block_{start}$; and in another case, $RIV = N_{RB}^{DL}(N_{RB}^{DL} - L_{CBLs} \times 1) + (N_{RB}^{DL} - 1 - Block_{start})$, where $Block_{start}$ is a start virtual block number, $L_{CBLs}$ is a quantity of consecutive virtual blocks, and $N_{RB}^{DL}$ is a total quantity of blocks in a downlink system bandwidth.

When the resource mapping from the block to the PRB is performed by using the distributed mapping based on the RIV indicated by the base station, there are two steps.

Step 1. Interleaving: Map the consecutive virtual blocks to inconsecutive blocks.

Step 2. Frequency hopping of a same virtual block between different time domain resources. Step 2 is optional.

For step 1, a quantity of all virtual blocks that can be used for the distributed mapping in the system bandwidth is calculated according to the following formulas:

$N_{VBL}^{DL} = N_{VBL,gap1}^{DL} = 2 \cdot \min(N_{gap}, N_{RB}^{DL} - N_{gap})$ if $N_{gap} = N_{gap,1}$, and $N_{VBL}^{DL} = N_{VBL,gap2}^{DL} = \lfloor N_{RB}^{DL}/2N_{gap} \rfloor \cdot 2N_{gap}$ if $N_{gap} = N_{gap,2}$, where $N_{gap,1}$ and $N_{gap,2}$ are determined based on the quantity of blocks included in the system bandwidth. For details, refer to Table 4. The base station indicates $N_{gap} = N_{gap,1}$ or $N_{gap} = N_{gap,2}$ by using signaling. Virtual blocks that can be interleaved are interleaved, and the virtual blocks are divided into one or more interleaving units. Specifically, when $N_{gap} = N_{gap,1}$, $\tilde{N}_{VBL}^{DL} = N_{VBL}^{DL}$, or when $N_{gap} = N_{gap,2}$, $\tilde{N}_{VBL}^{DL} = 2N_{gap}$. Virtual block numbers in an interleaving unit are written into an interleaving matrix row by row, and the interleaving matrix is of four columns and $N_{rows} = \lceil \tilde{N}_{VRB}^{DL}/(4P) \rceil \cdot P$ rows, where P is a quantity of virtual blocks in the RBG. If the entire matrix cannot be filled, null elements are filled, and the null elements are located in a second column and a fourth column of last $N_{null}/2$ rows. A quantity of elements filled with null is $N_{null} = 4N_{row} - \tilde{N}_{VBL}^{DL}$. According to the formulas, the interleaving matrix may be obtained as follows.

$$\begin{bmatrix} 0 & 1 & 2 & 3 \\ 4 & 5 & 6 & 7 \\ 8 & 9 & 10 & 11 \\ 12 & * & 13 & * \\ 14 & * & 15 & * \\ 16 & * & 17 & * \end{bmatrix}$$

Then, a virtual block number is read in a column-by-column manner, and a null element is ignored, to obtain an interleaved virtual block sequence. A sequence number of the interleaved virtual block sequence corresponds to a block number, to be specific, a block corresponding to an interleaved $j^{th}$ virtual block (virtual block$_k$) is a block j.

Figure 6:
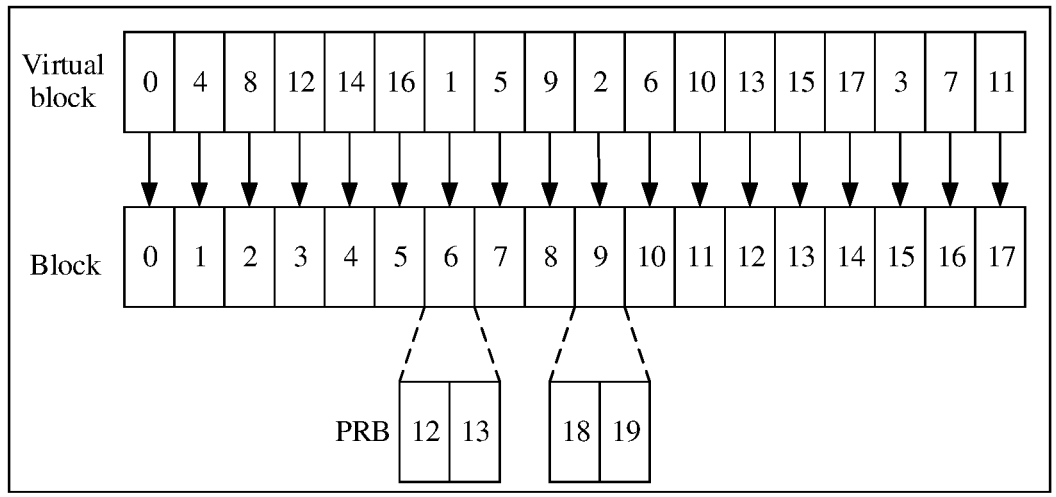
FIG. 6 is a schematic diagram of a resource mapping between a virtual block and a physical block according to this application.

For example, as shown in FIG. 6, in a resource mapping result from the virtual block to the PRB, a virtual block 1 corresponds to a physical block 6, and the physical block 6 includes a PRB 12 and a PRB 13. A virtual block 2 corresponds to a physical block 9, and the physical block 9 includes a PRB 18 and a PRB 19.

The frequency hopping between the different time domain resources in step 2 means that one virtual block is mapped to time resources of different physical blocks between the different time domain resources (different slots).

For example, each physical block includes two time resources. If one block is 14 symbols, and each time resource includes 7 symbols (first 7 symbols and last 7 symbols), a physical block on a first time resource is a physical block obtained in step 1, and a physical block on the first time resource is a physical block that shifts by $\tilde{N}_{VBL}^{DL}/2$ in the interleaving unit of the virtual block and that is obtained in step 1.

It should be noted that, in comparison with the resource allocation type 2 in the prior art, in the calculation formula of the RIV of the improved resource allocation type 2, a start location of the resource allocation is changed from the start VRB number ($RB_{start}$) to the start virtual block number ($Block_{start}$). A consecutively allocated VRB length ($L_{CRBs}$) is changed to a quantity ($L_{CBLs}$) of consecutively allocated virtual blocks. $N_{RB}^{DL}$ is no longer a total quantity of downlink RBs, but a total quantity of downlink blocks. A gap value also needs to be changed based on a quantity of downlink virtual blocks. The allocation method of the existing resource allocation type 2 in LTE and the distributed mapping formula from the VRB to the PRB are still applicable. In this case, for the element in the interleaving matrix in a distributed VRB mapping process, a VRB number is replaced with a virtual block number.

Because the physical block to which each virtual block is mapped includes consecutive PRBs, the PRBs to which each virtual block is mapped may be consecutive by using the foregoing improved resource allocation method.

In this improved solution, the base station needs to configure a quantity of RBs in one block, namely, a block size, for the user. For example, the base station performs a configuration by using RRC signaling/broadcast information/a MAC CE or other higher layer signaling or a control channel, and the configuration may be a cell-level configuration or a user-level configuration.

In some application scenarios, it needs to ensure that N consecutive PRBs are mapped to N consecutive VRBs. In this scenario, the foregoing block-related resource allocation method may also be used. In this case, lengths of all blocks in embodiments of the present invention may be considered as N.

The improved solution is not limited to a downlink, and the same resource allocation method may also be applied to an uplink.

In the prior art, the quantity of bits required for resource allocation is mainly a quantity of bits occupied by the resource indication value, and the quantity of bits required for resource allocation is related to the quantity of consecutive VRBs or $N_{RB}^{DL}$. However, the improved solution causes the quantity of bits required for resource allocation to be related to the block size and the total quantity of blocks. For example, when the block size is relatively small, the quantity of bits of the resource indication value is relatively large; or when the block size is relatively large, the quantity of bits of the resource indication value is relatively small. Therefore, based on the block size, the quantity of bits of the resource indication value in the DCI needs to be determined, or a quantity of bits in the DCI and a resource allocation indication parameter are determined.

In a second possible design, an element in the interleaving matrix of the resource allocation type 2 is still an existing VRB. An improvement is as follows: VRB interleaving in a VRB interleaving matrix is changed to block interleaving, to form a block interleaving matrix, each block is equivalent to one VRB group and includes a plurality of VRBs, and a length of each interleaved block may be set to a length of a block. In this way, it can be ensured that each VRB with the length of the block can be mapped to consecutive PRBs.

It is assumed that each block includes two RBs. In a first case, an input block interleaving matrix is as follows.

$$\begin{bmatrix} [0\ 1] & [2\ 3] & [4\ 5] & [6\ 7] \\ [8\ 9] & [10\ 11] & [12\ 13] & [14\ 15] \\ [16\ 17] & [18\ 19] & [20\ 21] & [22\ 23] \\ [24\ 25] & [*\ *] & [26\ 27] & [*\ *] \\ [28\ 29] & [*\ *] & [30\ 31] & [*\ *] \\ [32\ 33] & [*\ *] & [34\ 35] & [*\ *] \end{bmatrix}$$

In a second case, an input mode is to perform input every k rows, where k>1, and k is a quantity of RBs in each block. For example, if each block includes two RBs, an input block interleaving matrix is as follows.

$$\begin{bmatrix} 0 & 2 & 4 & 6 \\ 1 & 3 & 5 & 7 \\ 8 & 10 & 12 & 14 \\ 9 & 11 & 13 & 15 \\ 16 & 18 & 20 & 22 \\ 17 & 19 & 21 & 23 \\ 24 & * & 26 & * \\ 25 & * & 27 & * \\ 28 & * & 30 & * \\ 29 & * & 31 & * \\ 32 & * & 34 & * \\ 33 & * & 35 & * \end{bmatrix}$$

In this case, the mapping formula from the VRB to the PRB is related to a parameter of the block, and the parameter of the block includes the block size and a quantity of blocks on which the distributed mapping can be performed.

It should be noted that the foregoing VRB-PRB mapping (interleaving) method may also be applicable to another scenario. To be specific, interleaving of a single element in an original interleaving matrix is changed to block interleaving, and a length of a block in the block interleaving may be unrelated to the block and may be a fixed value, or may be configured by the base station, or may be related to another parameter such as a subband bandwidth or a full band bandwidth. The mapping method from the VRB to the PRB is for a concept in frequency domain. In time domain, the VRB/PRB may span one or more symbols or slots or mini-slots or subframes. Likewise, the interleaving method is not only applicable to a data channel/signal, but also applicable to a control channel or a control signal, or another channel or signal, and the mapping (interleaving) method may be used for both an uplink and a downlink. For example, for the control channel, resource allocation of control information is related to a resource unit group/resource element group (REG). A REG occupies one symbol in time domain and occupies one RB in frequency domain. Several consecutive REGs in frequency domain are considered as a REG group. The mapping (interleaving) method from the VRB to the PRB may be considered as mapping (interleaving) of the REG.

Similar to the first possible design, in this improved solution, the base station needs to configure a quantity of VRBs in one block for the user, and VRBs in each block are mapped to consecutive PRBs. For example, the base station performs a configuration by using RRC signaling/broadcast information/a MAC CE or other higher layer signaling or a control channel, and the configuration may be a cell-level configuration or a user-level configuration.

The improved solution is not limited to a downlink, and the same resource allocation method may also be applied to an uplink.

In the prior art, the quantity of bits required for resource allocation is mainly a quantity of bits occupied by the resource indication value, and the quantity of bits required for resource allocation is related to the quantity of consecutive VRBs or $N_{RB}^{DL}$. However, the improved solution causes the quantity of bits required for resource allocation to be related to the block size and the total quantity of blocks. For example, when the block size is relatively small, the quantity of bits of the resource indication value is relatively large; or when the block size is relatively large, the quantity of bits of the resource indication value is relatively small. Therefore, based on the block size, the quantity of bits of the resource indication value in the DCI needs to be determined, or a quantity of bits in the DCI and a resource allocation indication parameter are determined.

In addition, the block in the improved solution may be alternatively a PRB group including consecutive PRBs, to meet different scheduling granularity requirements.

The foregoing two improved resource allocation methods for the resource allocation type 2 resolve the problem that consecutive VRBs allocated to the terminal are mapped to inconsecutive PRBs in the resource allocation type 2. This solution in combination with a configurable resource allocation granularity may map a resource allocated to the terminal to some consecutive or inconsecutive blocks, and a resource included in each block is consecutive PRBs.

It can be learned from the foregoing several embodiments that the existing resource allocation type 0 may better implement the block RS, but the existing resource allocation type 1 and the existing resource allocation type 2 need to be specially designed to meet a low-PAPR application requirement that an uplink reference signal and a downlink reference signal are symmetric block RSs. In addition, the resource allocation type 0 may be defined as a resource allocation method that has a block RS requirement, and the existing resource allocation type 1 and the existing resource allocation type 2 are resource allocation methods for another RS type.

In a first possible design, two RS configurations are predefined between the terminal and the base station.

In a first RS configuration, when the uplink reference signal and the downlink reference signal are symmetric block RSs, the resource allocation type 0 is used to allocate an uplink resource or a downlink resource, to ensure that the allocated resource is mapped to a plurality of consecutive PRBs.

In a second RS configuration, when at least one reference signal is another type of reference signal, for example, when an allocated resource does not need to be mapped to a plurality of consecutive PRBs, any one of the existing resource allocation type 0, the existing resource allocation type 1, and the existing resource allocation type 2 may be used to allocate an uplink resource or a downlink resource.

For the terminal, use of an RS type may be determined based on a resource allocation type.

When the resource allocation type is the existing resource allocation type 1 or the existing resource allocation type 2, another type of reference signal is selected for the uplink reference signal or the downlink reference signal; or when the resource allocation type is the existing resource allocation type 0, a symmetric block RS is selected for the uplink reference signal and/or the downlink reference signal. There is a resource allocation type specific to a block RS type by establishing a relationship between the resource allocation type and the RS type, to reduce complexity of a system design.

The terminal may determine the resource allocation type based on configuration information of the resource allocation.

Based on a same concept, this application provides a terminal as described above, and the terminal as described above is configured to perform terminal-related method steps in various embodiments of this application.

In a possible design, the terminal includes a plurality of function modules, configured to perform the terminal-related method steps in various embodiments of this application, so that in a large bandwidth scenario, excessively high indication overheads of resource allocation are avoided, and a resource allocation granularity can also be flexibly configured, to meet different service requirements.

Figure 7:
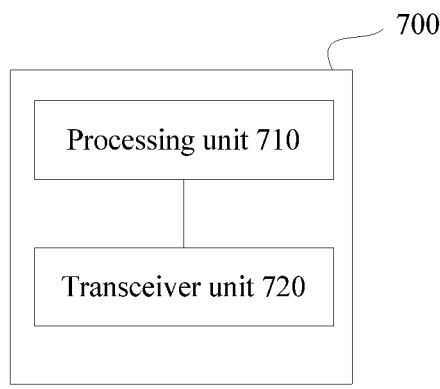
FIG. 7 is a schematic structural diagram of a terminal according to this application.

As shown in FIG. 7, a terminal 700 includes a processing unit 710 and a transceiver unit 720. It should be noted that an operation performed by the processing unit 710 or the transceiver unit 720 may be considered as an operation of the terminal 700.

In a possible design, a structure of the terminal includes a processor and a transceiver. The processor is configured to support the terminal in performing corresponding functions in the foregoing resource allocation method in the communications system. The transceiver is configured to: support communication between the terminal and a base station, and send information or an instruction used in the foregoing resource allocation method in the communications system to the base station. The terminal may further include a memory. The memory is coupled to the processor and configured to store a program instruction and data that are necessary for the terminal. The processing unit 710 in the terminal 700 may be implemented by a processor of the terminal 700, and the transceiver unit 720 may be implemented by a transceiver in the terminal 700.

Specifically, the processor is configured to: determine a size of a first frequency domain resource unit based on configuration information, where the configuration information includes predefined first configuration information, or the configuration information includes second configuration information sent by a base station to the terminal, or the configuration information includes the first configuration information and the second configuration information; and determine a resource-allocation-related parameter based on the size of the first frequency domain resource unit.

In a possible design, the first frequency domain resource unit is a set of one or more consecutive virtual resource blocks.

In a possible design, the first configuration information includes a correspondence between the size of the first frequency domain resource unit and at least one of a subband identifier and a frequency band identifier.

In a possible design, the processor is configured to determine, based on the size of the first frequency domain resource unit, a quantity of bits required for resource allocation.

In a possible design, the processor is further configured to determine a size of a second frequency domain resource unit based on third configuration information, where the third configuration information is configuration information sent by the base station to the terminal, or the third configuration information is predefined configuration information.

In a possible design, the processor is further configured to: determine the resource-allocation-related parameter based on the size of the second frequency domain resource unit; or determine the resource-allocation-related parameter based on the size of the first frequency domain resource unit and the size of the second frequency domain resource unit.

In a possible design, the second frequency domain resource unit is a set of one or more consecutive physical resource blocks.

In a possible design, the transceiver is further included. The transceiver is configured to receive a first reference signal sent by the base station, where the first reference signal is carried in at least one second frequency domain resource unit; and/or the transceiver is further configured to send a second reference signal to the base station, where the second reference signal is carried in at least one second frequency domain resource unit.

In a possible design, the size of the first frequency domain resource unit is N times the size of the second frequency domain resource unit, where N is an integer greater than or equal to 1.

In a possible design, the resource-allocation-related parameter includes at least one of a quantity of bits required for resource allocation, a resource indication value for resource allocation, and a resource mapping manner for resource allocation.

For detailed descriptions of functions of apparatuses or components in the terminal, refer to the related content of other embodiments of this application. Details are not described herein again.

Based on a same concept, this application provides a base station as described above, and the base station as described above is configured to perform base-station-related method steps in various embodiments of this application.

Figure 8:
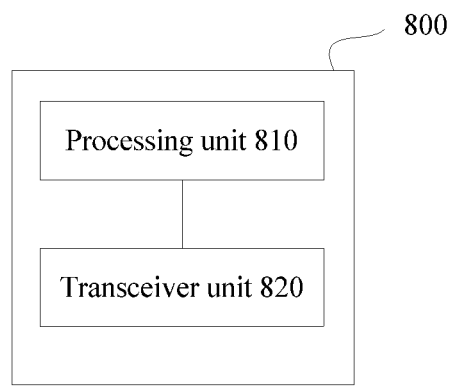
FIG. 8 is a schematic structural diagram of a base station according to this application.

In a possible design, the base station includes a plurality of function modules, configured to perform the base-station-related method steps in various embodiments of this application, so that in a large bandwidth scenario, excessively high indication overheads of resource allocation are avoided, and a resource allocation granularity can also be flexibly configured, to meet different service requirements. A base station 800 shown in FIG. 8 includes a processing unit 810 and a transceiver unit 820. An operation performed by the processing unit 810 or the transceiver unit 820 may be considered as an operation of the base station 800.

In a possible design, a structure of the base station includes a processor and a transceiver. The processor is configured to support the base station in performing corresponding functions in the foregoing resource allocation method in the communications system. The transceiver is configured to: support communication between a terminal and the base station, and send information or an instruction used in the foregoing resource allocation method in the communications system to the terminal. The base station may further include a memory. The memory is coupled to the processor and configured to store a program instruction and data that are necessary for the base station. The processing unit 810 in the base station 800 may be implemented by a processor of the base station 800, and the transceiver unit 820 may be implemented by a transceiver in the base station 800.

Specifically, the transceiver is configured to send second configuration information to the terminal, where the second configuration information is used to indicate a size of a first frequency domain resource unit to the terminal, and the size of the first frequency domain resource unit is used to determine a resource-allocation-related parameter.

In a possible design, the first frequency domain resource unit is a set of one or more consecutive virtual resource blocks.

In a possible design, the transceiver is further configured to send a first reference signal to the terminal, where the first reference signal is carried in at least one second frequency domain resource unit; and/or the transceiver is further configured to receive a second reference signal sent by the terminal, where the second reference signal is carried in at least one second frequency domain resource unit.

In a possible design, the size of the first frequency domain resource unit is N times the size of the second frequency domain resource unit, where N is an integer greater than or equal to 1.

In a possible design, the second frequency domain resource unit is a set of one or more consecutive physical resource blocks.

For detailed descriptions of functions of apparatuses or components in the base station, refer to the related content of other embodiments of this application. Details are not described herein again.

It should be noted that, in this embodiment of this application, for a structure relationship of the transceiver, the processor, the memory, and a bus system included in either of the terminal and the base station, reference may be made to FIG. 9. A transceiver 905 in FIG. 9 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network communications interface, a cellular network communications interface, or a combination thereof.

A processor 902 in this embodiment of this application may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (generic GAL) device, or any combination thereof. A memory 903 may include a volatile memory, for example, a random-access memory (RAM). Alternatively, the memory 903 may include a nonvolatile memory, for example, a read-only memory (ROM), a flash memory, a hard disk drive (HDD), or a solid state drive (SSD). Alternatively, the memory 903 may include a combination of the foregoing types of memories.

A bus system 904 may be further included in this embodiment of this application, and the bus system 904 may include any quantity of interconnected buses and bridges, and specifically links various circuits of one or more processors represented by the processor 902 and memories represented by the memory 903. A bus may further link various other circuits such as a peripheral device, a voltage stabilizer, and a power management circuit. This is not further described in this application. The transceiver 905 provides a unit configured to communicate with various other devices on a transmission medium. The processor 902 is responsible for bus architecture management and general processing. The memory 903 may store data used by the processor 902 when the processor 1201 performs an operation.

Based on a same concept, this application provides a computer-readable storage medium. The computer-readable storage medium stores an instruction, and when the instruction runs on a computer, the computer is enabled to perform the terminal-related method steps in various embodiments of this application.

Based on a same concept, this application provides a computer-readable storage medium. The computer-readable storage medium stores an instruction, and when the instruction runs on a computer, the computer is enabled to perform the base-station-related method steps in various embodiments of this application.

Based on a same concept, this application provides a computer program product including an instruction, and when the instruction runs on a computer, the computer is enabled to perform the terminal-related method steps in various embodiments of this application.

Based on a same concept, this application provides a computer program product including an instruction, and when the instruction runs on a computer, the computer is enabled to perform the base-station-related method steps in various embodiments of this application.

A person skilled in the art may clearly understand that, descriptions of the embodiments provided in the present invention may be reference for each other. For ease and brevity of description, for functions of the apparatuses and devices and performed steps that are provided in the embodiments of the present invention, refer to related descriptions in the method embodiment of the present invention. Details are not described herein again.

Based on a same concept, this application further provides a resource allocation method in a communications system. The method includes: obtaining, by a terminal, indication information, where the indication information is used to indicate a size of a resource block group; and determining, by the terminal, the size of the resource block group according to the indication information.

In a possible design, the terminal determines the size of the resource block group based on the indication information and an identifier of a subband to which the terminal belongs and/or an identifier of a frequency band to which terminal belongs.

In a possible design, a base station may further determine the indication information based on the identifier of the subband to which the terminal belongs and/or the identifier of the frequency band to which terminal belongs, and send the indication information to the terminal.

In another implementable method, optionally, the terminal determines the size of the resource block group based on the identifier of the subband to which the terminal belongs and/or the identifier of the frequency band to which terminal belongs and a preset relationship, and the preset relationship is a correspondence between the identifier of the subband to which the terminal belongs and/or the identifier of the frequency band to which terminal belongs and the size of the resource block group. The size of the resource block group is flexibly configured by using the foregoing method, to meet different service requirements in a future mobile communications system.

The size of the resource block group is a size of a first resource block group, and the first resource block group includes at least one consecutive resource block. Further, the communications system further includes a second resource block group, the second resource block group includes at least one consecutive resource block, and the size of the first resource block group is N times a size of the second resource block group, where N is an integer greater than or equal to 1.

For a resource allocation type 1 or 2, the base station indicates resource allocation information to the terminal by using DCI, and a resource allocation granularity of the resource allocation information is the second resource block group. Based on the DCI, the size of the second resource block group, and the like, the terminal determines a resource allocation parameter for scheduling the terminal. A resource allocation manner in which the second resource block group is the resource allocation granularity can ensure resource continuity when the terminal is scheduled.

Based on a same concept, this application further provides a terminal, configured to perform the terminal-related method steps in the foregoing resource allocation method in the communications system. Based on a same concept, this application further provides a base station, configured to perform the base-station-related method steps in the foregoing resource allocation method in the communications system.

For specific content of the foregoing resource allocation method in the communications system, refer to the content in the various embodiments of this application. Details are not described herein again.

A person skilled in the art may further understand that various illustrative logical blocks and steps that are listed in the embodiments of this application may be implemented by using electronic hardware, computer software, or a combination thereof. In order to clearly display the interchangeability between the hardware and the software, functions of the foregoing various illustrative components and steps have been generally described. Whether the functions are implemented by using hardware or software depends on particular applications and a design requirement of the entire system. A person of ordinary skill in the art may use various methods to implement the described functions for each particular application, but it should not be considered that the implementation goes beyond the scope of the embodiments of the present invention.

The various illustrative logical blocks, modules, and circuits described in the embodiments of this application may implement or operate the described functions by using a general processing unit, a digital signal processing unit, an application-specific integrated circuit (ASIC), a field programmable gate array (FPGA) or another programmable logical apparatus, a discrete gate or transistor logic, a discrete hardware component, or a design of any combination thereof. The general processing unit may be a microprocessing unit. Optionally, the general processing unit may be any conventional processing unit, controller, microcontroller, or state machine. The processing unit may be implemented by a combination of computing apparatuses, such as a digital signal processing unit and a microprocessing unit, a plurality of microprocessing units, one or more microprocessing units with a digital signal processing unit core, or any other similar configuration.

Steps of the methods or algorithms described in the embodiments of this application may be directly embedded into hardware, a software module executed by a processing unit, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processing unit so that the processing unit may read information from the storage medium and write information to the storage medium. Alternatively, the storage medium may further be integrated into a processing unit. The processing unit and the storage medium may be arranged in an ASIC, and the ASIC may be arranged in a user terminal. Alternatively, the processing unit and the storage medium may be arranged in different components of the user terminal.

In one or more example designs, the functions described in the embodiments of this application may be implemented by using hardware, software, firmware, or any combination thereof. If this application is implemented by software, these functions may be stored in a computer-readable medium or are transmitted to the computer-readable medium in a form of one or more instructions or code. The computer-readable medium is either a computer storage medium or a communications medium that enables a computer program to move from one place to another. The storage medium may be an available medium that may be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of an instruction or a data structure or in a form that can be read by a general or special computer or a general or special processing unit. In addition, any connection may be appropriately defined as a computer-readable medium. For example, if software is transmitted from a website, a server, or another remote resource by using a coaxial cable, an optical fiber, a twisted pair, a digital subscriber line (DSL) or in a wireless manner, such as infrared, radio, or microwave, the software is included in a defined computer-readable medium. The disc include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

According to the foregoing description of this specification in this application, technologies in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs but may also be extended to a maximum scope that is consistent with the principles and disclosed new features of this application.

What is claimed is:

1. A method comprising:
   receiving resource allocation indication information, wherein the resource allocation indication information is usable to determine a subband corresponding to an allocated resource;
   receiving second configuration information, wherein the second configuration information indicates one configuration of configurations of a first frequency domain resource unit size corresponding to the subband;
   determining the one configuration of the configurations of the first frequency domain resource unit size corresponding to the subband based on first configuration information and the second configuration information, wherein the first configuration information comprises a correspondence between the subband and the configurations of the first frequency domain resource unit size; and
   determining a resource-allocation-related parameter based on the one configuration of the configurations of the first frequency domain resource unit size, wherein the resource-allocation-related parameter comprises a quantity of bits required for resource allocation.

2. The method according to claim 1, wherein the first configuration information is predefined.

3. The method according to claim 1, wherein the second configuration information indicates the one configuration of the configurations of the first frequency domain resource unit size corresponding to the subband by using $\lceil \log_2 N \rceil$ bits, wherein N is a quantity of the configurations of the first frequency domain resource unit size corresponding to the subband, and $\lceil \ \rceil$ indicates rounding up.

4. The method according to claim 1, wherein the second configuration information is carried on radio resource control signaling.

5. The method according to claim 1, wherein a granularity of the first frequency domain resource unit size is a first frequency domain resource unit, and the first frequency domain resource unit is a resource block group (RBG).

6. A method comprising:
   sending resource allocation indication information, wherein the resource allocation indication information is usable to determine a subband corresponding to an allocated resource;
   sending second configuration information, wherein the second configuration information indicates one configuration of configurations of a first frequency domain resource unit size corresponding to the subband; and
   wherein the second configuration information and first configuration information are usable for a determining the one configuration of the configurations of the first frequency domain resource unit size corresponding to the subband, and wherein the first configuration information comprises a correspondence between the subband and the configurations of the first frequency domain resource unit size; and
   wherein the one configuration of the configurations of the first frequency domain resource unit size is usable to determine a resource-allocation-related parameter, wherein the resource-allocation-related parameter comprises a quantity of bits required for resource allocation.

7. The method according to claim 6, wherein the first configuration information is predefined.

8. The method according to claim 6, wherein the second configuration information indicates the one configuration of the configurations of the first frequency domain resource unit size corresponding to the subband by using $\lceil \log_2 N \rceil$ bits, wherein N is a quantity of the configurations of the first frequency domain resource unit size corresponding to the subband, and $\lceil \ \rceil$ indicates rounding up.

9. The method according to claim 6, wherein the second configuration information is carried on radio resource control signaling.

10. The method according to claim 6, wherein a granularity of the first frequency domain resource unit size is a first frequency domain resource unit, and the first frequency domain resource unit is a resource block group (RBG).

11. An apparatus comprising:
    a processor; and
    a computer-readable storage medium storing a program to be executed by the processor, the program including instructions for:
      receiving resource allocation indication information, wherein the resource allocation indication information is usable to determine a subband corresponding to an allocated resource;
      receiving second configuration information, wherein the second configuration information indicates one configuration of configurations of a first frequency domain resource unit size corresponding to the subband;
      determining the one configuration of the configurations of the first frequency domain resource unit size corresponding to the subband based on first configuration information and the second configuration information, wherein the first configuration information comprises a correspondence between the subband and the configurations of the first frequency domain resource unit size; and
      determining a resource-allocation-related parameter based on the one configuration of the configurations of the first frequency domain resource unit size, wherein the resource-allocation-related parameter comprises a quantity of bits required for resource allocation.

12. The apparatus according to claim 11, wherein the first configuration information is predefined.

13. The apparatus according to claim 11, wherein the second configuration information indicates the one configuration of the configurations of the first frequency domain resource unit size corresponding to the subband by using $\lceil \log_2 N \rceil$ bits, wherein N is a quantity of the configurations of the first frequency domain resource unit size corresponding to the subband, and $\lceil\ \rceil$ indicates rounding up.

14. The apparatus according to claim 11, wherein the second configuration information is carried on radio resource control signaling.

15. The apparatus according to claim 11, wherein a granularity of the first frequency domain resource unit size is a first frequency domain resource unit, and the first frequency domain resource unit is a resource block group (RBG).

* * * * *